(12) United States Patent
Kang et al.

(10) Patent No.: US 8,646,000 B2
(45) Date of Patent: Feb. 4, 2014

(54) AUGMENTED REMOTE CONTROLLER AND METHOD FOR OPERATING THE SAME

(75) Inventors: Mingoo Kang, Seoul (KR); Haengjoon Kang, Seoul (KR); Sunjung Hwang, Seoul (KR); Jongsoon Park, Seoul (KR); Jinyung Park, Seoul (KR); Jongchul Kim, Seoul (KR); Junho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 240 days.

(21) Appl. No.: 12/959,696

(22) Filed: Dec. 3, 2010

(65) Prior Publication Data

US 2011/0138416 A1 Jun. 9, 2011

Related U.S. Application Data

(60) Provisional application No. 61/266,950, filed on Dec. 4, 2009.

(30) Foreign Application Priority Data

Apr. 21, 2010 (KR) .................. 10-2010-0036990

(51) Int. Cl.
*H04N 5/445* (2011.01)

(52) U.S. Cl.
USPC .................. 725/39; 725/40; 725/43; 345/633

(58) Field of Classification Search
None
See application file for complete search history.

(56) References Cited

U.S. PATENT DOCUMENTS

| | | | |
|---|---|---|---|
| 6,037,936 A | 3/2000 | Ellenby et al. | |
| 6,243,054 B1 | 6/2001 | DeLuca | |
| 6,285,362 B1 | 9/2001 | Kikuchi et al. | |
| 6,559,813 B1 | 5/2003 | DeLuca et al. | |
| 6,791,467 B1 | 9/2004 | Ben-Ze'ev | |
| 7,610,555 B2 * | 10/2009 | Klein et al. | 715/738 |
| 8,180,396 B2 * | 5/2012 | Athsani et al. | 455/557 |
| 2003/0007104 A1 | 1/2003 | Hoshino et al. | |
| 2003/0034998 A1 | 2/2003 | Kodosky et al. | |
| 2004/0243694 A1 | 12/2004 | Weast | |
| 2005/0251825 A1 * | 11/2005 | Fukuda et al. | 725/44 |
| 2006/0159109 A1 | 7/2006 | Lamkin et al. | |
| 2006/0253874 A1 | 11/2006 | Stark et al. | |
| 2006/0269056 A1 | 11/2006 | Montag | |
| 2007/0106721 A1 | 5/2007 | Schloter | |
| 2007/0136315 A1 * | 6/2007 | Choi et al. | 707/10 |
| 2007/0136778 A1 | 6/2007 | Birger et al. | |
| 2007/0150828 A1 | 6/2007 | Tsukada et al. | |
| 2008/0005764 A1 * | 1/2008 | Arling et al. | 725/39 |
| 2008/0267459 A1 | 10/2008 | Nakada et al. | |

(Continued)

OTHER PUBLICATIONS

U.S. Office Action for U.S. Appl. No. 12/959,714 dated Mar. 22, 2013.

(Continued)

*Primary Examiner* — Chenea Smith
(74) *Attorney, Agent, or Firm* — KED & Associates LLP

(57) ABSTRACT

An image display may be controlled on a remote controller based on augmented reality. An image display apparatus may be identified that is connected to a network or located about the remote controller. A search may be made for content information regarding content playable in the identified image display apparatus. The content information may be received based on the searching. A screen may display a content guide image based on the received content information while simultaneously displaying an image of the identified image display apparatus.

25 Claims, 20 Drawing Sheets

(56) References Cited

U.S. PATENT DOCUMENTS

| | | |
|---|---|---|
| 2009/0102859 A1 | 4/2009 | Athsani et al. |
| 2009/0167919 A1 | 7/2009 | Anttila et al. |
| 2009/0257591 A1 | 10/2009 | Mithal et al. |
| 2009/0300679 A1 | 12/2009 | Hiroi et al. |
| 2010/0082784 A1* | 4/2010 | Rosenblatt et al. ........... 709/222 |
| 2012/0032945 A1 | 2/2012 | Dare et al. |

OTHER PUBLICATIONS

U.S. Office Action for U.S. Appl. No. 12/959,730 dated Apr. 23, 2013.

Office Action for U.S. Appl. No. 12/959,714 dated Sep. 12, 2012.

Office Action for U.S. Appl. No. 12/959,730 dated Aug. 15, 2012.

* cited by examiner

AUGMENTED REMOTE CONTROLLER AND METHOD FOR OPERATING THE SAME

CROSS-REFERENCE TO RELATED APPLICATION

This application claims benefit and priority from Korean Patent Application No. 10-2010-0036990, filed Apr. 21, 2010 and U.S. Provisional Application No. 61/266,950 filed Dec. 4, 2009, the subject maters of which are incorporated herein by reference.

This application is also related to U.S. application Ser. No. 12/959,714 filed Dec. 3, 2010 and U.S. application Ser. No. 12/959,730 filed Dec. 3, 2010 (PBC-0221), the subject matters of which are incorporated herein by reference.

BACKGROUND

1. Field

Embodiments of the present invention may relate to an augmented remote controller, a method for controlling the augmented remote controller, and a system for the same. The augmented remote controller may identify an image display apparatus, an external device connectable to the image display apparatus, contents available from the image display apparatus or the external device, and/or other types of objects and may display related information. A user may control an object around the user and receive information related to the object using the augmented remote controller.

2. Background

An image display apparatus may display images viewable to a user. The user can view a broadcast program through the image display apparatus. The image display apparatus may be connected to an external device. The user can view contents available from the external device through the image display apparatus. The image display apparatus may also be connected to a content provider over a network. The user can view contents available from the content provider through the image display apparatus over the network.

Content viewable to users through image display apparatuses and information related to the contents may be increasing. The users may want to receive content-related information as well as to view contents through the image display apparatuses. User convenience may increase if an image display apparatus and various types of external devices are efficiently controlled by use of a single remote controller.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
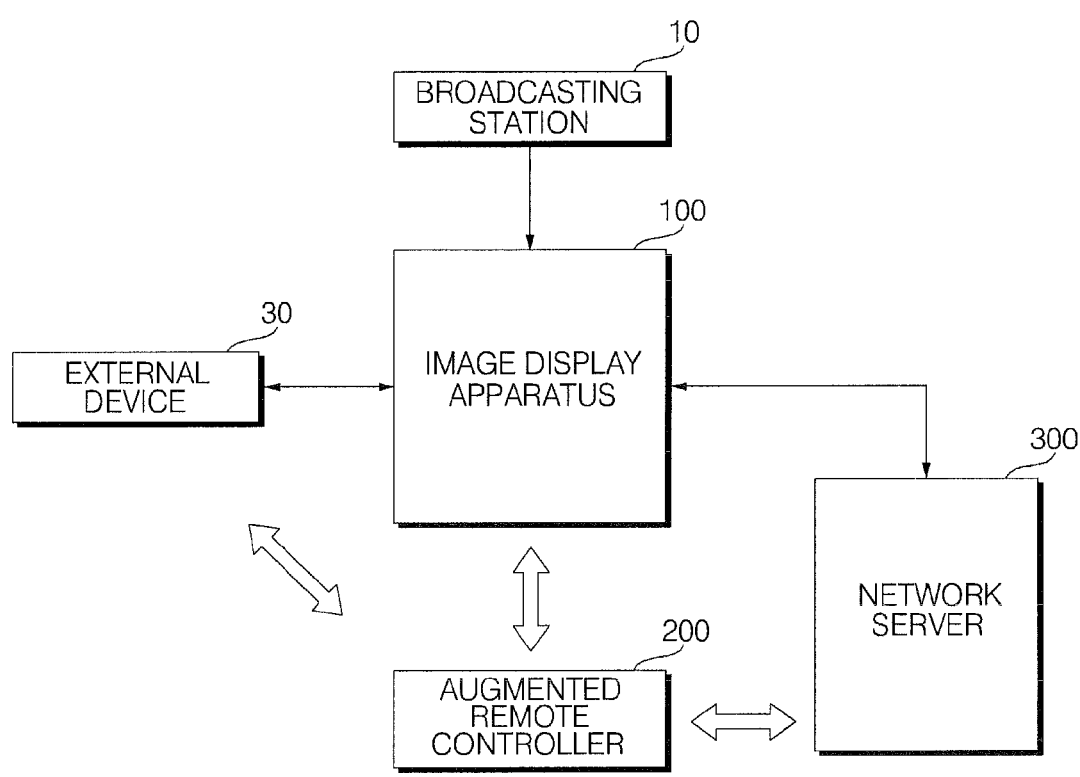
FIG. 1 is a block diagram of an augmented remote control system according to an exemplary embodiment of the present invention.

Embodiments of the present invention may provide a remote controller for controlling an image display apparatus or an external device connected to the image display apparatus.

Embodiments of the present invention may provide a remote controller for enabling a user to efficiently use and manage contents played or stored in an image display apparatus or an external device connected to the image display apparatus, and information related to the contents.

Embodiments of the present invention may provide a remote controller for searching for additional information about contents played or available in an image display apparatus, displaying the determined additional information, providing a user with detailed information regarding a user interface image provided through the image display apparatus, and providing information customized for an individual user about the user interface image.

Embodiments may be accomplished by a method for operating an augmented remote controller that provides a user interface by augmented reality, which includes identifying (or determining) an image display apparatus connected to a home network, searching for content information which is information regarding a content playable in the image display apparatus, receiving the content information, and displaying a content guide image based on the content information.

The terms "module", "unit", and "unit" attached to describe names of components may be used herein to help understanding of components and thus should not be considered as having specific meanings or roles. Accordingly, the terms "module" and "unit" may be interchangeable in their use.

Embodiments may be described with reference to an augmented remote controller. Embodiments are also applicable to other devices, such as pointing devices, goggles and/or other devices with a display.

According to an exemplary embodiment, an augmented remote controller may identify an object around a user (or about a user) and provide information related to the identified object to the user, thereby offering an augmented reality environment to the user. The object around the user may be an image display apparatus that is controllable using the augmented remote controller, an external device connected to the image display apparatus, contents available from the image display apparatus or the external device, and/or other types of objects.

The augmented remote controller may identify an object around the user by collecting user-related information. For example, the augmented remote controller may collect information regarding location or bearing of the user using a Global Positioning System (GPS) or a compass. Further, the augmented remote controller may capture an image of a real environment of the user by a camera and thus identify an object around the user. The augmented remote controller may also identify an object around the user using a Radio Frequency IDentification (RFID) reader.

The augmented remote controller may identify an object around the user, search for information related to the identified object, and display the detected (or determined) information. The type of the detected information may correspond to the type of the identified object.

For example, when the augmented remote controller identifies an image display apparatus or an external device around the user, it may search for information regarding a content list available from the image display apparatus or the external device. Additionally, the augmented remote controller may search for information regarding a user interface through which the image display apparatus or the external device can be controlled. The augmented remote controller may display the detected information regarding the image display apparatus or the external device to the user.

The augmented remote controller may identify contents provided by an image display apparatus or an external device around the user. The augmented remote controller may search for information regarding contents and display determined information to the user. The augmented remote controller may display a user interface through which the user can edit, play back, and/or transmit contents provided by the image display or the external device.

The augmented remote controller may identify any other type of object around the user (or about the user). For example, the user may capture an image of a piece of furniture around the user using a camera provided in the augmented remote controller. The augmented remote controller may identify that the object captured by the camera is a piece of furniture, referring to a database that stores information regarding images of a number of objects. The augmented remote controller may search for information regarding the furniture, such as name or manufacturer of the furniture, and display the detected information to the user.

The augmented remote controller may augment a real image captured by the camera with detected information regarding an object captured by the camera. For example, the augmented remote controller may display a real image captured by the camera on a display, search for information regarding an object included in the displayed real image, and display the determined information regarding the object on the display using a pop-up window or an icon. Additionally, the augmented remote controller may display the determined information regarding the object as an image or as text on the display.

The user may view the real image augmented with the information detected by the augmented remote controller, through the augmented remote controller. The user may identify information regarding the real image or an object included in the real image by the augmented information overlaid on the real image captured by the camera.

If the display that displays the augmented real image is a touch screen, the user may interact with the augmented remote controller by selecting a pop-up window, an icon, an image, and/or text representing the augmented information. For example, when the user selects a pop-up window representing first augmented information, the augmented remote controller may execute an application related to the first augmented information. The application may be an application that controls an object such as an image display apparatus or an external device included in the augmented real image.

If the augmented remote controller uses a transparent display, the augmented remote controller may display augmented information overlaid on a real image projected onto the transparent display. The augmented remote controller may search for information regarding an object included in the displayed real image and display the determined information as augmented information on the transparent display.

The augmented remote controller may wirelessly transmit signals to and receive signals from an image display apparatus or an external device connectable to the image display apparatus. The user may control the image display apparatus or the external device using the augmented remote controller. The augmented remote controller may receive information regarding operation status of the image display apparatus or the external device and display the received information on the display.

The augmented remote controller may be connected to a network including the Internet. The augmented remote controller may search for information regarding an identified object through the network and display the detected information on the display.

FIG. 1 is a block diagram of an augmented remote control system according to an exemplary embodiment of the present invention.

As shown in FIG. 1, an augmented remote controller 200 may transmit signals to and receive signals from an image display apparatus 100, an external device 30 connectable to the image display apparatus 100, and/or a network server 300. The image display apparatus 100 can play various kinds of contents. The image display apparatus 100 may receive an external signal including a video signal corresponding to a content. The image display apparatus 100 may extract the video signal from the received signal and display an image corresponding to the extracted video signal.

The external device 30 can play back contents that are stored in compliance with a predetermined standard. The external device 30 may include a display. The external device 30 may display an image corresponding to a played content on the display. The external device 30 may be connected to the image display apparatus 100 and may transmit a signal including a video signal corresponding to a content to the image display apparatus 100. The image display apparatus 100 may display an image corresponding to the video signal included in the received signal.

The image display apparatus 100 may receive a broadcast signal from a broadcasting station 10 and may display an image corresponding to a video signal included in the broadcast signal. The image display apparatus 100 may also receive a signal including a video signal from the network server 300 over the network including the Internet and display an image corresponding to the video signal included in the received signal.

When the image display apparatus 100 is connected to the Internet, the image display apparatus 100 may receive a signal including a video signal corresponding to a specific content from a content provider on the Internet to provide contents over the Internet and display an image corresponding to the video signal.

The augmented remote controller 200 may identify or determine the image display apparatus 100 or the external device 30. More specifically, the augmented remote controller 200 may identify or determine the image display apparatus 100 or the external device 30 by capturing an image of a real environment of a user and analyzing the captured image. If an RFID tag is attached to the image display apparatus 100 or the external device 30, the augmented remote controller 200 may receive a signal from the image display apparatus 100 or the external device 30 through an RFID reader and identify the image display apparatus 100 or the external device 30 based on the received signal.

The augmented remote controller 200 may identify or determine the image display apparatus 100 or the external device 30 by transmitting and receiving another type of signals to and from the image display apparatus 100 or the external device 30. For example, the augmented remote controller 200 may transmit and receive InfraRed (IR) or Radio Frequency (RF) signals to and from the image display apparatus 100 or the external device 30. The augmented remote controller 200 may be paired with the image display apparatus 100 or the external device 30, which transmits and receives IR or RF signals. The image display apparatus 100 or the external device 30 may identify or determine a signal received from the paired augmented remote controller 200.

The augmented remote controller 200 may display menus for controlling the identified image display apparatus 100 or the external device 30 on the display of the augmented remote controller 200. The user may enter a command to control the image display apparatus 100 or the external device 30 by selecting a menu on the display or manipulating a button or key of the augmented remote controller 200. The augmented remote controller 200 may transmit a signal carrying the user-input command to the image display apparatus 100 or the external device 30. The image display apparatus 100 or the external device 30 may be controlled by the signal transmitted from the augmented remote controller 200.

The augmented remote controller 200 may identify the image display apparatus 100 or the external device 30 by use of a camera, an RFID reader, etc. The augmented remote controller 200 may identify information related to contents provided by the identified image display apparatus 100 or the external device 30 from metadata received from the image display apparatus 100 or the external device 30. Further, the augmented remote controller 200 may search the network server 300 for the information related to the contents provided by the image display apparatus 100 or the external device 30.

The augmented remote controller 200 may display the content-related information on its display. The type of the content-related information may correspond to type of the contents identified by the augmented remote controller 200.

For example, when a shopping-related content is currently provided, the augmented remote controller 200 may search for information regarding price of an item, name of a product, a store that sells the product, and/or an on-line shopping site in association with the shopping-related content. When a content related to a famous tourist spot is currently provided, the augmented remote controller 200 may search for content-related information such as name of the tourist spot, souvenirs, photos and/or videos of the tourist spot, etc. When the current content is a movie, the augmented remote controller 200 may search for information regarding a producer, production company, and cast of the movie and other movie-related information. The user may set types of information that the augmented remote controller 200 is to search for based on content types.

Figure 2:
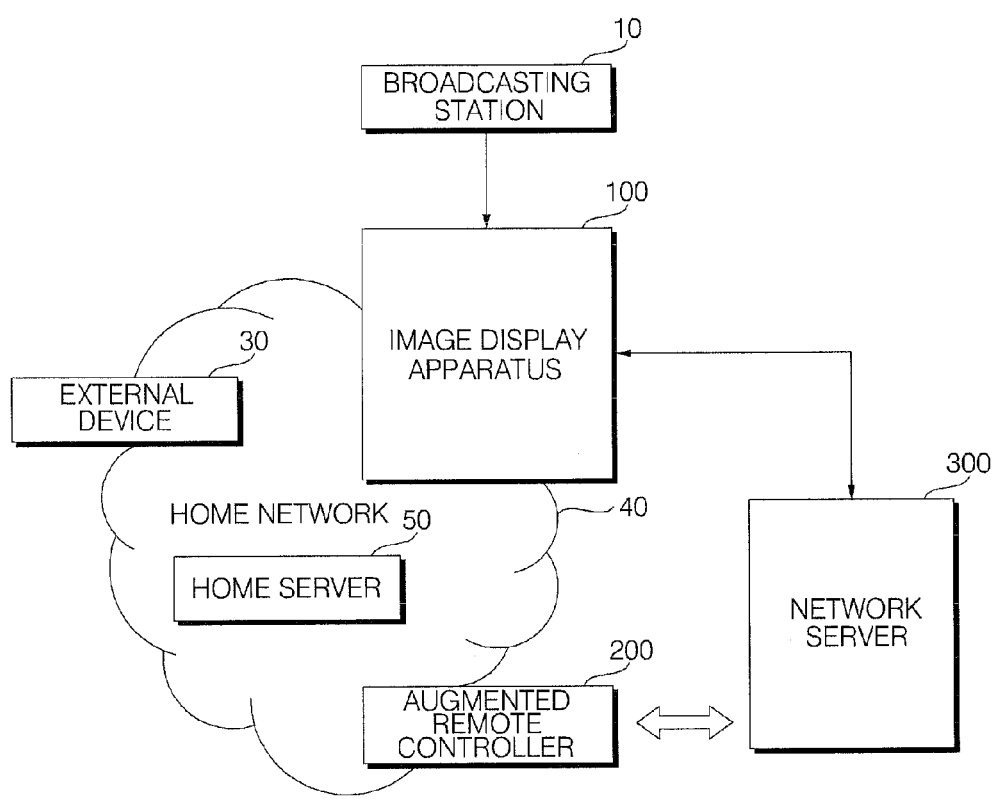
FIG. 2 is a block diagram of an augmented remote control system according to an exemplary embodiment of the present invention.

FIG. 2 is a block diagram of an augmented remote control system according to an exemplary embodiment of the present invention.

The augmented remote controller 200 may directly transmit signals to or receive signals from the image display apparatus 100 and the external device 30. Alternatively or additionally, the augmented remote controller 200 may transmit signals to or receive signals from a home server 50 of a home network 40 connected to the image display apparatus 100 or the external device 30. The home network 40 is a network in which a predetermined number of image display apparatuses 100 or external devices 30 may transmit signals to or receive signals from according to a predetermined network communication standard. The home network 40 may be independent of the network in which the network server 300 including the content provider is built. The home network 40 may be configured in an office or a home.

The home server 50 may store information regarding the image display apparatus 100 and the external network 30 connected to the home network 40. For example, the home server 50 may store information regarding a product name, a model name, a use guide, and available contents of the image display apparatus 100 or the external network 30 connected to the home network 40. The home server 50 may also control signal transmission and reception to and from the home network 40.

The augmented remote controller 200 may identify a type of the image display apparatus 100 or the external network 30 connected to the home network 40 by camera, RFID reader, etc. The augmented remote controller 200 may receive information regarding the image display apparatus 100, information regarding the external device 30, and/or information regarding contents available from the image display apparatus 100 or the external device 30, directly from the image display apparatus 100 or the external device 30, through the home server 50, and/or through the network server 300.

The augmented remote controller 200 may display the detected (or determined) information on its display. Augmented information may be overlaid on an image captured by the camera or a real image projected on the transparent display. The augmented remote controller 200 may display the augmented real image overlapped with the augmented information on the display.

Figure 3:
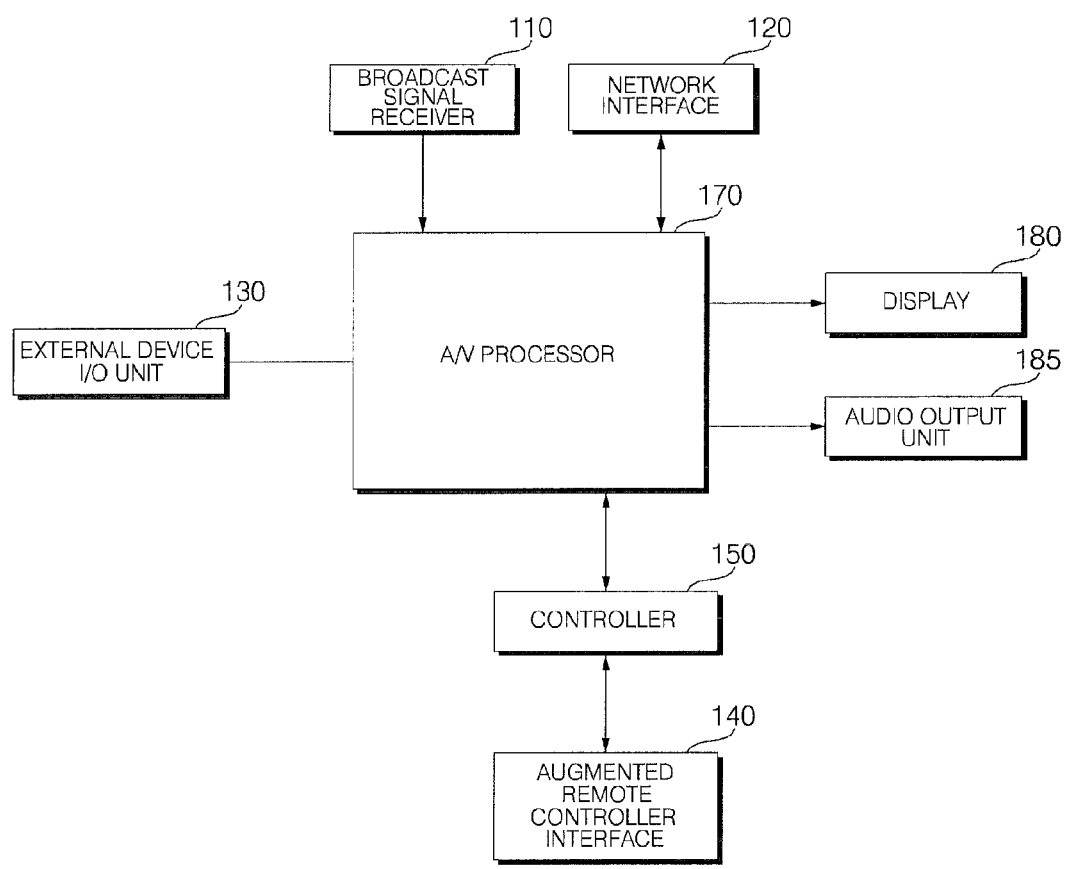
FIG. 3 is a block diagram of an image display apparatus according to an exemplary embodiment of the present invention.

FIG. 3 is a block diagram of an image display apparatus according to an exemplary embodiment of the present invention.

As shown in FIG. 3, the image display apparatus 100 may include a broadcast signal receiver 110, a network interface 120, an external device Input/Output (I/O) unit 130, a remote controller interface 140 (or augmented remote controller interface), a controller 150, an A/V processor 170, a display 180, and an audio output unit 185.

The broadcast signal receiver 110 may select an RF broadcast signal corresponding to a channel selected by a user from among a plurality of RF broadcast signals received through an antenna or an RF broadcast signal corresponding to each of pre-memorized channels, and downconvert the RF broadcast signal to a digital Intermediate Frequency (IF) signal or an analog baseband A/V signal.

The broadcast signal receiver 110 may receive RF broadcast signals from an Advanced Television Systems Committee (ATSC) single-carrier system and/or from a Digital Video Broadcasting (DVB) multi-carrier system.

The broadcast signal receiver 110 may sequentially select RF broadcast signals corresponding to all broadcast channels previously memorized in the image display apparatus 100 by a channel-add function from among a plurality of RF signals received through the antenna, and may downconvert the selected RF broadcast signals to IF signals or baseband A/V signals. This operation may be performed to display a thumbnail list that includes a plurality of thumbnail images corresponding to broadcast channels on the display 180. Accordingly, the broadcast signal receiver 110 may receive the RF broadcast signal of the selected channel, and/or may receive the RF broadcast signals of all of the pre-memorized channels sequentially or periodically.

The network interface 120 may interface between the image display apparatus 100 and a wired/wireless network such as the Internet.

The network interface 120 may include a wireless communication module for connecting the image display apparatus 100 wirelessly to the Internet. For wireless Internet connection, the network interface 120 may operate in conformance with communication standards such as Wireless Local Area Network (WLAN) (i.e. Wi-Fi), Wireless Broadband (WiBro), World Interoperability for Microwave Access (WiMax), and/or High Speed Downlink Packet Access (HSDPA).

The network interface 120 may receive contents or data from a content provider or a network provider over a network. The received contents or data may include contents such as movies, advertisements, games, Video-on-Demand (VoD) files, and broadcast signals, and information related to the contents. The network interface 120 may also receive update information and update files of firmware from the network operator.

The external device I/O unit 130 may interface between the external device 30 and the image display apparatus 100. For interfacing, the external device I/O unit 130 may include an A/V I/O unit (not shown) and/or a wireless communication module (not shown).

The external device I/O unit 130 may be connected wirelessly or wiredly to the external device 30 such as a Digital Versatile Disc (DVD), a Blu-ray disc, a game player, a camera, a camcorder, and/or a computer (e.g. a laptop computer). The external device I/O unit 130 may receive video, audio, and/or data signals from the connected external device 30 and transmit the received external input signals to the A/V processor 170. Additionally, the external device I/O unit 130 may output video, audio, and/or data signals processed by the A/V processor 170 to the connected external device 30.

To provide video and audio signals received from the external device 30 to the image display apparatus 100, the A/V I/O unit of the external device I/O unit 130 may include an Ethernet port, a Universal Serial Bus (USB) port, a Composite Video Banking Sync (CVBS) port, a component port, a Super-video (S-video) (analog) port, a Digital Visual Interface (DVI) port, a High-Definition Multimedia Interface (HDMI) port, a Red-Green-Blue (RGB) port, and/or a D-sub port.

The wireless communication module of the external device I/O unit 130 may perform short-range wireless communication with other external devices. For short-range wireless communication over a network, the wireless communication module may operate in compliance with communication standards such as Bluetooth, RFID, InfraRed Data Association (IrDA), Ultra WideBand (UWB), and ZigBee.

The external device I/O unit 130 may be connected to various set-top boxes through at least one of the Ethernet port, the USB port, the CVBS port, the component port, the S-video port, the DVI port, the HDMI port, the RGB port, and the D-sub port and may thus receive data from or transmit data to the various set-top boxes.

For example, in an Internet Protocol TV (IPTV) set-top box, the external device I/O unit 130 may provide video, audio and/or data signals received from the IPTV set-top box to the A/V processor 170 and provide signals processed by the A/V processor 170 to the IPTV set-top box in order to enable interactive communication.

Depending on types of transmission networks, the term "IPTV" may refer to Asynchronous Digital Subscriber Line-TV (ADSL-TV), Very high data rate Digital Subscriber Line-TV (VDSL-TV), Fiber To The Home-TV (FTTH-TV), TV over DSL, Video over DSL, TV over IP (TVIP), Broadband TV (BTV), etc. Additionally, the term "IPTV" may cover Internet TV and full browsing TV.

The external device I/O unit 130 may be connected to a communication network that enables voice calls or video calls. The communication network may be any of a broadcasting communication network connected by a LAN, a Public Switched Telephone Network (PSTN), and/or a mobile communication network.

The augmented remote controller interface 140 may include a wireless communication module (not shown) for wirelessly transmitting signals to and receiving signals from the augmented remote controller 200, and a coordinate calculator (not shown) for calculating coordinates of a target position to which a pointer should be moved in correspondence with movement of the augmented remote controller 200.

The augmented remote controller interface 140 may wirelessly transmit and receive signals to and from the augmented remote controller 200 through an RF module. The augmented remote controller interface 140 may also wirelessly receive signals from the augmented remote controller 200 through an IR module according to an IR communication standard.

The coordinate calculator of the augmented remote controller interface 140 may correct handshakes or errors in the signal corresponding to movement of the augmented remote controller 200 received through the wireless communication module of the augmented remote controller interface 140. After correcting handshakes or errors, the coordinate calculator may calculate x and y coordinates of the target position at which the pointer should be displayed on the display 180.

The controller 150 may identify a movement or key manipulation of the augmented remote controller 200 from a signal received from the augmented remote controller 200 through the augmented remote controller interface 140 and thus may control an operation of the image display apparatus 100 based on the identified movement or key manipulation.

In another example, the augmented remote controller 200 may calculate coordinates of a target position to which the pointer should be moved in correspondence with movement of the augmented remote controller 200 and may output the calculated coordinates to the augmented remote controller interface 140. The augmented remote controller interface 140 may transmit information about the received pointer coordinates to the controller 150 without correcting handshakes or errors.

The controller 150 may provide overall control to the image display apparatus 100. The controller 150 may receive a signal from the augmented remote controller 200 through the augmented remote controller interface 140. The controller 150 may also receive a command through a local key of the image display apparatus 100. Thus, the controller 150 may identify a command included in the received signal or the command corresponding to the manipulated local key and thus control the image display apparatus 100 according to the command.

For example, upon receipt of a command to select a particular channel from the user, the controller 150 may control the broadcast signal receiver 110 to receive a broadcast signal of the selected channel. The controller 150 may control the A/V processor 170 to process a video or audio signal of the selected channel. The controller 150 may also control the A/V processor 170 to output information regarding the selected channel along with the processed video or audio signal to the display 180 or the audio output unit 185.

In another example, the user may enter another type of A/V output command through the augmented remote controller 200. That is, the user may want to view a video signal input from a camera or a camcorder through the external device I/O unit 130, rather than a broadcast signal. In this example, the controller 150 may control the A/V processor 170 to output an audio or video signal received through the USB port of the external device I/O unit 130 to the audio output unit 185 or the display 180.

The image display apparatus 100 may further include a user interface controller for generating a Graphic User Interface (GUI) related to the image display apparatus 100. The controller 150 may perform a function of the user interface controller. In an exemplary embodiment, the user interface controller may be described as a separate component.

A GUI created by the user interface controller may be output to the display 180 or the audio output unit 185 through the A/V processor 170. The GUI may change according to a command included in a signal received from the augmented remote controller 200, a command received through a local key of the image display apparatus 100, and/or an operation of the image display apparatus 100

For example, upon receipt of a signal from the augmented remote controller 200, the user interface controller may generate a pointer image signal corresponding to movement of the augmented remote controller 200 and output the pointer image signal to the A/V processor 100. The controller 150 may output information regarding coordinates of a target position to which the pointer should be moved, calculated from the signal received from the augmented remote controller 200, to the user interface controller. The user interface controller may generate the pointer image signal based on the received coordinate information. The A/V processor 170 may perform signal processing such that the pointer corresponding to the pointer image signal created by the user interface controller is displayed on the display 180. The pointer displayed on the display 180 may correspond to movement of the augmented remote controller 200.

In another example, the user interface controller may generate a user interface image signal including an object corresponding to a command included in a signal received from the augmented remote controller 200, a command input by a local key, and/or an operation of the image display apparatus 100 and output the user interface image signal to the A/V processor 170.

The object may include a widget that is displayed on the display 180 to enter a command to the image display apparatus 100 and/or to represent information related to the image display apparatus 100. The widget may be displayed in On Screen Display (OSD).

The object may be selectable meaning that additional information exists if selected. Type of objects may include a device object, a content object and a menu object, for example.

The object may be displayed as an image or text that represents information about the image display apparatus 100 or as an image or text representing an image displayed on the image display apparatus 100, such as a volume level, channel information, a current time, etc. The object may be realized as any other form (e.g. a moving picture) according to type of information that can be or should be displayed on the image display apparatus 100. Objects according to the exemplary embodiments should not be construed as limiting the scope and spirit of the present invention.

A widget is an element by which the user can change particular data on his own or her own on a GUI. For example, a widget may be one of a volume control button, a channel selection button, a menu, an icon, a navigation tab, a scroll bar, a progress bar, a text box, and a window, which are displayed on the display 180. The form of a widget realized in the image display apparatus 100 may vary with the specification of a GUI that can be implemented or should be implemented in the image display apparatus 100. Widgets according to exemplary embodiments do not limit the present invention.

The A/V processor 170 may process an audio signal and/or a video signal included in a signal received through the broadcast signal receiver 110, the network interface 120, and the external device I/O unit 130 to be suitable for the display 180. The A/V processor 170 may process the audio signal and/or the video signal based on information carried by a data signal received along with the audio signal and/or video signal.

The A/V processor 170 may process an audio signal and/or the video signal received through the user interface controller so that the audio signal and/or video signal is output through the display 180 and/or the audio output unit 185. The user may identify an operation status of the image display apparatus 100 or enter a command related to the image display apparatus 100 on a GUI displayed on the display 180 according to the audio signal and/or the video signal generated from the user interface controller.

The A/V processor 170 may select an audio signal and/or a video signal to be processed based on a user command received through the controller 150. The audio signal and/or the video signal processed by the A/V processor 170 are output through the audio output unit 185 and/or the display 180. The user command may be a broadcast channel selection command, a command to select a content to be played from among contents input to the image display apparatus 100, or the like.

In accordance with an exemplary embodiment, the A/V processor 170 may process a video signal so that an external input two-dimensional (2D) or three-dimensional (3D) video signal is displayed on the display 180. The A/V processor 170 may process a video signal such that a user interface created by the user interface controller is displayed in 3D on the display 180. The A/V processor 170 may be described below in great detail with reference to FIG. 4.

The display 180 may generate a driving signal by converting a video signal, a data signal, and/or an OSD signal processed by the A/V processor 170, or a video signal and/or a data signal received through the external device I/O unit to an RGB signal. The display 180 may be any one of various types of displays such as a Plasma Display Panel (PDP), a Liquid Crystal Display (LCD), an Organic Light Emitting Diode (OLED), and/or a flexible display. According to an exemplary embodiment, the display 180 may be capable of displaying 3D images.

For 3D visualization, the display 180 may be configured into an auto-stereoscopic 3D display (glasses-free) and/or a traditional stereoscopic 3D display (with glasses).

Auto-stereoscopy is a method of displaying 3D images without any auxiliary device, for example, special polarization glasses on the part of a user. Thus, the display 180 may display 3D images on its own. Renticular and parallax barrier are examples of auto-stereoscopic 3D imaging.

The traditional stereoscopy may require an auxiliary device besides the display 180 in order to display 3D images. The auxiliary device may be a Head Mount Display (HMD) type, a glasses type, etc. As special 3D glasses, there are polarization glasses, shutter glasses, and a spectrum filter.

The display 180 may also be implemented as a touch screen so that it is used not only as an output device but also as an input device.

The audio output unit 185 may receive a processed audio signal (e.g. a stereo signal, a 3.1-channel signal or a 5.1-channel signal) from the A/V processor 170 and output the received audio signal as voice. The audio output unit 185 may be implemented into various types of speakers.

Figure 4:
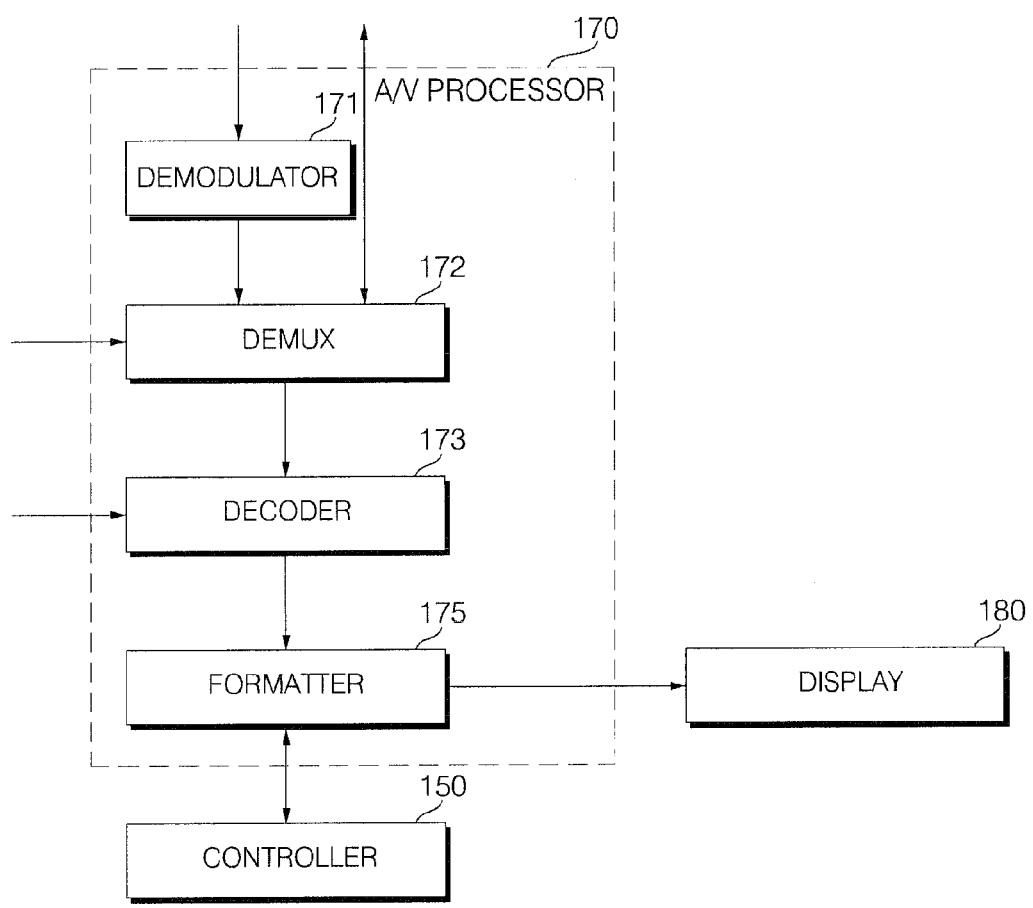
FIG. 4 is a block diagram of an Audio/Video (A/V) processor in the image display apparatus according to an exemplary embodiment of the present invention.

FIG. 4 is a block diagram of the A/V processor in an image display apparatus according to an exemplary embodiment of the present invention.

As shown in FIG. 4, the A/V processor 170 may include a demodulator 171, a Demultiplexer (DEMUX) 172, a decoder 173, and a formatter 175.

The demodulator 171 may demodulate a broadcast signal received from the broadcast signal receiver 110. For example, the demodulator 171 may receive a digital IF signal DIF from the broadcast signal receiver 110 and demodulate the digital IF signal DIF. The demodulator 171 may also perform channel decoding. For channel decoding, the demodulator 171 may include a convolutional decoder (not shown), a deinterleaver (not shown) and a Reed-Solomon decoder (not shown) and perform convolutional decoding, de-interleaving and Reed-Solomon decoding.

The demodulator 171 may perform demodulation and channel decoding on the digital IF signal received from the broadcast signal receiver 110, thereby obtaining a stream signal TS. The stream signal TS may be a signal in which a video signal, an audio signal and/or a data signal are multiplexed. For example, the stream signal TS may be an Moving Picture Experts Group-2 (MPEG-2) Transport Stream (TS) signal obtained by multiplexing an MPEG-2 video signal and a Dolby AC-3 audio signal. The MPEG-2 TS signal may include a 4-byte header and a 184-byte payload.

In order to properly handle not only ATSC signals but also DVB signals, the demodulator 171 may include an ATSC demodulator and a DVB demodulator. The demodulator 171 may output the stream signal TS to the DEMUX 172.

The DEMUX 172 may demultiplex the stream signal TS, for example, an MPEG-2 TS into an audio signal, a video signal, and a data signal. The DEMUX 172 may receive the stream signal from the demodulator 171, the network interface 120, or the external device I/O unit 130.

The data signal obtained by demultiplexing the input stream signal may be a coded data signal. The coded data signal may include Electronic Program Guide (EPG) information that provides broadcasting information such as titles and start and end times of broadcast programs played on each broadcast channel. For example, the EPG information may be ATSC-Program and System Information Protocol (TSC-PSIP) information in case of ATSC, whereas it may be DVB-Service Information (DVB-SI) in case of DVB.

The decoder 173 may decode the demultiplexed signals. In this exemplary embodiment, the decoder 173 may include a video decoder for decoding the demultiplexed video signal, and a scaler for controlling resolution of the decoded video signal to a resolution level at which the decoded video signal can be output in the image display apparatus 100.

In accordance with an exemplary embodiment, the A/V processor 170 may further include a mixer for mixing an external video signal input to the image display apparatus 100 with a video signal generated from the user interlace controller. While the mixer may be incorporated into the formatter 175 in function, the mixer may be described herein as being separate from the formatter 175, for ease of convenience. The display 180 may display an image based on a mixed video signal. The mixer may output the mixed video signal to the formatter 175.

The formatter 175 may identify a format of the mixed video signal referring to a data signal related to the video signal. The formatter 175 may convert the video signal to a format suitable for the display 180 and output the converted video signal to the display 180.

In this exemplary embodiment, the image display apparatus 100 may display a 3D image on the display 180. The formatter 175 may create a 3D video signal in a predetermined format by separating the mixed video signal into multi-viewpoint image signals and may output the 3D video signal to the display 180. The display 180 may display a 3D image based on the 3D video signal.

A 3D image may be formed with multi-viewpoint images. The user may view the multi-viewpoint images with his or her left and right eyes. Disparity between the multi-viewpoint images viewed by the left and right eyes may provide the illusion of 3D to the user. The multi-viewpoint images that form the 3D image are a left-eye image perceivable to the left eye and a right-eye image perceivable to the right eye.

The format of a 3D video signal may be determined according to the layout of the left-eye and right-eye images of the 3D video signal. The left-eye and right-eye images may be provided on the left and right sides, respectively. This may be called a side by side format. The left-eye and right-eye images may be arranged vertically in a top-down format. A time-division layout of the left-eye and right-eye images may be called a frame sequential format. The left-eye and right-eye images may alternate with each other line by line. This may be called an interlaced format. The left-eye and right-eye images may be mixed in the form of boxes in a checker box format.

A video signal included in an external signal input to the image display apparatus 100 and a GUI video signal created from the user interface controller may be 3D video signals in which 3D images are realized. The mixer may mix these 3D video signals and output the mixed 3D video signal to the formatter 175.

The formatter 175 may identify the format of the mixed 3D video signal referring to a related data signal. The formatter 175 may process the 3D video signal according to the identified format and output the processed 3D video signal to the display 180. If limited 3D image formats are available to the display 180, the formatter 175 may convert the received 3D video signal to a 3D image format in which the display 180 can display a 3D image and output the converted 3D video signal to the display 180.

If the formatter 175 fails to identify the format of the mixed video signal referring to the related data signal, it may use a predetermined algorithm to thereby identify the format. For example, the formatter 175 may identify the format of an input 3D video signal by analyzing edges of an image created based on the input 3D video signal.

If the input mixed video signal is a 2D video signal that allows 2D visualization, the formatter 175 may generate a 3D video signal using a 2D-3D conversion algorithm.

Figure 5:
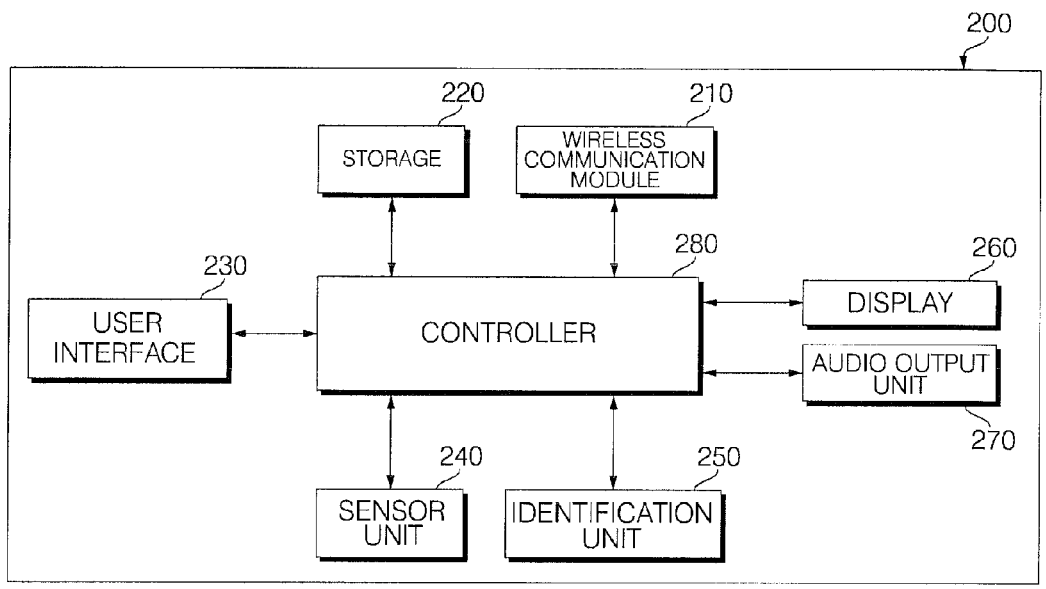
FIG. 5 is a block diagram of an augmented remote controller according to an exemplary embodiment of the present invention.

FIG. 5 is a block diagram of the augmented remote controller 200 according to an exemplary embodiment of the present invention. As discussed above, embodiments may also be applicable to other devices such as pointing devices, goggles, or other devices with displays.

Referring to FIG. 5, the augmented remote controller 200 may include a wireless communication module 210, a storage 220 (or memory), a user interface 230, a sensor unit 240, an identification unit 250, a display 260, an audio output unit 270, and a controller 280.

The wireless communication module 210 may transmit signals to and receive signals from electronic devices such as the image display apparatus 100, the external device 30, the home server 50, and/or the network server 300. The augmented remote controller 200 may further include an RF module for transmitting signals to and receiving signals from an adjacent device in compliance with an RF communication standard. The augmented remote controller 200 may also include an IR module for transmitting signals to and receiving signals from an adjacent device in compliance with an IR communication standard.

The augmented remote controller 200 may communicate with other electronic devices according to other various communication standards. Besides the wireless communication module 210, the augmented remote controller 200 may have a module suitable for signal transmission and reception based on a particular communication standard. The wireless communication module 210 may transmit and receive signals, for example, in Bluetooth, RFID, IrDA, UWB, and/or ZigBee.

The wireless communication module 210 may transmit signals to and receive signals from the Internet by various wireless Internet standards and thus may be equipped with modules for signal transmission and reception based on particular wireless Internet standards. Wireless Internet standards available to the augmented remote controller 200 may include WLAN, WiBro, WiMax and HSDPA.

In an exemplary embodiment, the augmented remote controller 200 may transmit a signal carrying information regarding an operation of the augmented remote controller 200 to an electronic device through the wireless communication module 210. The augmented remote controller 200 may also receive a signal from the electronic device through the RF module. The augmented remote controller 200 may transmit commands such as a power on/off command, a channel change command, and/or a volume change command to the electronic device through the IR module.

The storage 220 (or memory) may store a number of programs and application data required for controlling or operating the augmented remote controller 200. If the augmented remote controller 200 wirelessly transmits signals to and receives signals from an electronic device through the RF module, the augmented remote controller 200 and the electronic device may exchange signals with each other in a predetermined frequency band. The controller 280 may store information regarding a frequency band in which the augmented remote controller 200 can wirelessly communicate with a paired adjacent device in the storage 220 and thus may later refer to the stored information.

The user interface 230 may include a keypad or a plurality of buttons. A user may enter commands to the image display apparatus 100 by manipulating the user interface 230. If the user interface 230 includes a plurality of hard-key buttons, the user may input various commands to the image display apparatus 100 by pressing the hard-key buttons. Alternatively or additionally, if the user interface 230 includes a touch screen displaying a plurality of soft keys, the user may input various commands to the image display apparatus 100 by touching the soft keys. The user interface 230 may also include various input tools other than those set forth herein, such as a scroll key and/or a jog key.

The sensor unit 240 may include sensors for collecting information regarding a user that uses the augmented remote controller 200. The sensor unit 240 may include a GPS, a compass, a gyro sensor, an acceleration sensor, and/or an IR sensor. The GPS may be used to locate the user and the compass may be used to determine the bearing of the user. The gyro sensor may sense movement of the augmented remote controller 200, for example, in X-, Y-, and Z-axis directions, and the acceleration sensor may sense a moving speed of the augmented remote controller 200.

The augmented remote controller 200 may identify or determine an object around the user (or about the user), referring to the user-related information collected by the sensor unit 240. The augmented remote controller 200 may also identify or determine a user's gesture, referring to the collected user-related information. The augmented remote controller 200 may be controlled based on a command corresponding to the user's gesture. If the command corresponding to the user's gesture is a command to control an electronic device, the augmented remote controller 200 may transmit a signal carrying the control command to the electronic device.

The identification unit 250 may identify an object around the user (or about the user), such as an electronic device. The identification unit 250 may include a camera, an RFID reader, an IR sensor, etc. The identification unit 250 may capture an image of the object by using the camera. The captured image of the object may be compared with images of various objects stored in the storage 220, the home server 50, and/or the network server 300. The identification unit 250 may analyze a pattern of the image and extract information regarding an object corresponding to an image with a pattern matching with the pattern of the captured image, thereby identifying the object.

The identification unit 250 may also identify an object by reading an RFID tag attached to the object using the RFID reader. Alternatively or additionally, the identification unit 250 may determine presence or absence of any object around the user using the IR sensor. The augmented remote controller 200 may refer to information regarding objects matching user positions or bearings. The information regarding the objects matching the user positions or bearings may be stored in the storage 220, the home server 50, and/or the network server 300.

The identification unit 250 may identify a current location and bearing of the user based on user-related information collected by the sensor unit 240 and may extract information regarding an object whose presence was sensed by the IR sensor, corresponding to the user location and bearing, from the stored information regarding objects, thus identifying or determining the object around the user. For example, the augmented remote controller 200 may refer to map information including information regarding buildings corresponding to user locations and bearings. In this example, the augmented remote controller 200 may identify or determine a building around the user, referring to information regarding objects corresponding to the location and bearing of the user that is carrying the augmented remote controller 200 in the map information.

The identification unit 250 may also identify a face, a finger print, and/or an iris of a person captured by the camera. The identification unit 250 may identify the person by comparing a pattern of the identified face, finger print, and/or iris with stored patterns of faces, finger prints, and/or irises. The controller 280 may search for information regarding an object identified by the identification unit 250. For example, if the identification unit 250 identifies a person, the controller 280 may search for information regarding the person such as name, age, and preferred contents of the person and output the detected information.

The audio I/O unit 270 may recognize a voice signal from a user.

The display 260 and the audio output unit 270 may output an image and a sound corresponding to a manipulation of the user interface 230 or a signal received from an electronic device such as the image display apparatus 100, the external device 30, the home server 50, and/or the network server 300. Thus, the user may determine from the display 960 and the audio output unit 270 whether the user interface 230 has been manipulated or the electronic device has been controlled.

The audio I/O unit may be configured separately, as an audio input unit and an audio output in an exemplary embodiment.

The display 260 may display information regarding an object included in an image captured by the camera. The display 260 may display an augmented real image obtained by superimposing detected (or determined) augmented information on the captured image. In another example, if the display 260 is implemented as a transparent display with a transparent panel, the user may view a real image of his or her environment on the transparent display 260. The augmented remote controller 200 may search for information regarding an object included in the real image displayed on the transparent display 260 and thus may display the determined object-related information on the transparent display 260.

The controller 280 may superimpose the augmented information on the captured image and may thus output the augmented real image to the display 260. The controller 280 may output an augmented information-related video signal to the display 260 so that the augmented information about the object included in the real image projected onto the transparent display 260 superimposed on the real image. The controller 280 may provide overall control to the augmented remote controller 200.

The controller 280 may transmit a signal corresponding to a manipulation of a particular key of the user interface 230 or a signal corresponding to an operation of the augmented remote controller 200 sensed by the sensor unit 240 to an electronic device through the wireless communication module 210.

The block diagrams of the image display apparatus 100 and the augmented remote controller 200 shown in FIGS. 3, 4 and 5 are exemplary embodiments. Depending on specifications of the image display apparatus 100 and the augmented remote controller 200 in real implementation, some components of the image display apparatus 100 and the augmented remote controller 200 may be incorporated or omitted, and/or new components may added to the image display apparatus 100 and the augmented remote controller 200. That is, two or more components may be incorporated into one component or one component may be configured as separate components, when needed. Additionally, a function of each block may be described for the purpose of describing exemplary embodiments and thus specific operations or devices should not be construed as limiting the scope and spirit of the present invention.

Figure 6:
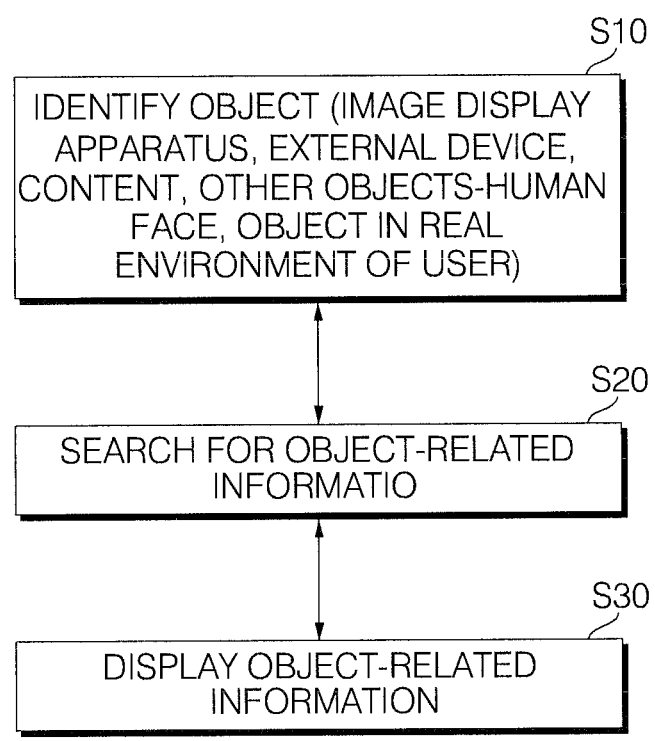
FIG. 6 is a flowchart illustrating a method for operating an augmented remote controller according to an exemplary embodiment of the present invention.

FIG. 6 is a flowchart illustrating a method for operating the augmented remote controller 200 according to an exemplary embodiment of the present invention. Other operations, orders of operations and embodiments are also within the scope of the present invention.

As shown in FIG. 6, the augmented remote controller 200 may identify or determine an object around a user (or about a user) in operation S10, search for information related to the identified object in operation S20, and display the determined object-related information in operation S30.

The augmented remote controller 200 may identify or determine various types of objects around the user. The user may select an intended type of objects through the augmented remote controller 200. For example, the user may select an electronic device so that the augmented remote controller 200 may identify or determine the electronic device. The augmented remote controller 200 may identify the electronic device around the user using an RFID tag attached to the electronic device.

The user may select content available from the image display apparatus 100 or the external device 200 as objects to be identified (or determined). The augmented remote controller 200 may identify or determine a content provided by the image display apparatus 100 or the external device 200 using metadata received from the image display apparatus 100, the external device 30, and/or the home server 50. That is, if an identification device such as the camera or the RFID reader provided in the augmented remote controller 200 points to the image display apparatus 100, the augmented remote controller 200 may identify or determine the image display apparatus 100 playing a content that the user wants to be identified and the augmented remote controller 200 may then identify the content being played in the image display apparatus 100 by using metadata related to the image display apparatus 100.

Additionally, the user may select a person for identification. In this example, the augmented remote controller 200 may read the face, the finger print, and/or the iris of the person by use of a camera, a finger print identifier, an iris identifier in the identification unit 250. The augmented remote controller 200 may identify the person by comparing the read information with information regarding the faces, finger prints, and/or irises of persons stored in a database.

The augmented remote controller 200 may also recognize a person from a voice input of the person.

The user may also select an object around him or her (e.g. a building, furniture, etc.). In this example, the augmented remote controller 200 may collect information regarding location or bearing of the user by GPS or compass. The augmented remote controller 200 may also capture an image of the object using the camera and identify the captured object, referring to image information regarding objects corresponding to the current user location or bearing in the database that stores information regarding objects by user location and bearing.

Information that the augmented remote controller 200 refers to for identifying an object may be stored in the image display apparatus 100, the external device 30, the storage 220 of the augmented remote controller 200, the home server 50, and/or the network server 300. Thus, the augmented remote controller 200 may search for information regarding an identified object in the image display apparatus 100, the external device 30, the storage 220 of the augmented remote controller 200, the home server 50, and/or the network server 300.

For example, when the augmented remote controller 200 identifies or determines the image display apparatus 100 or the external device 30, the augmented remote controller may search for a list of contents being played in the image display apparatus 100 or the external device 30. The augmented remote controller 200 may also search for a list of contents stored in the image display apparatus 100 or the external device 30. Additionally, the augmented remote controller 200 may search for information regarding a broadcast signal received at the image display apparatus 100. The augmented remote controller 200 may also search for information including menus with which to control the image display apparatus 100 or the external device 30.

When the augmented remote controller 200 identifies or determines a content being played or stored in the image display apparatus 100 or the external device 30, the augmented remote controller 200 may search for information related to the content. The content-related information may be a title of the content, shopping information for the content, etc.

If the augmented remote controller 200 identifies or determines a person, the augmented remote controller 200 may search for information regarding the person. The person-related information may specify a name, a age, a job and/or a phone number of the person, contents that the person prefers, and/or a history of contents that the person has viewed.

If the augmented remote controller 200 identifies or determines a real object around the user (e.g. a building, furniture, etc.), the augmented remote controller 200 may search for information related to the object. The object-related information may specify name, manufacturer, price, store, and/or use guide of the object.

The augmented remote controller 200 may display the detected information on the display 260. The detected information may be displayed in a pop-up window or as an icon. The detected information may be displayed as an image or as text. The augmented remote controller 200 may display the detected augmented information superimposed on an image captured by the camera.

The controller 280 may configure a screen of the display 260 such that determined information does not overlap with an object corresponding to the detected information from among the objects included in the real environment of the user. When displaying augmented information on the transparent display, the controller 280 may also configure a screen of the display 260 such that the augmented information is displayed without overlapping with an object corresponding to the augmented information.

Figure 7:
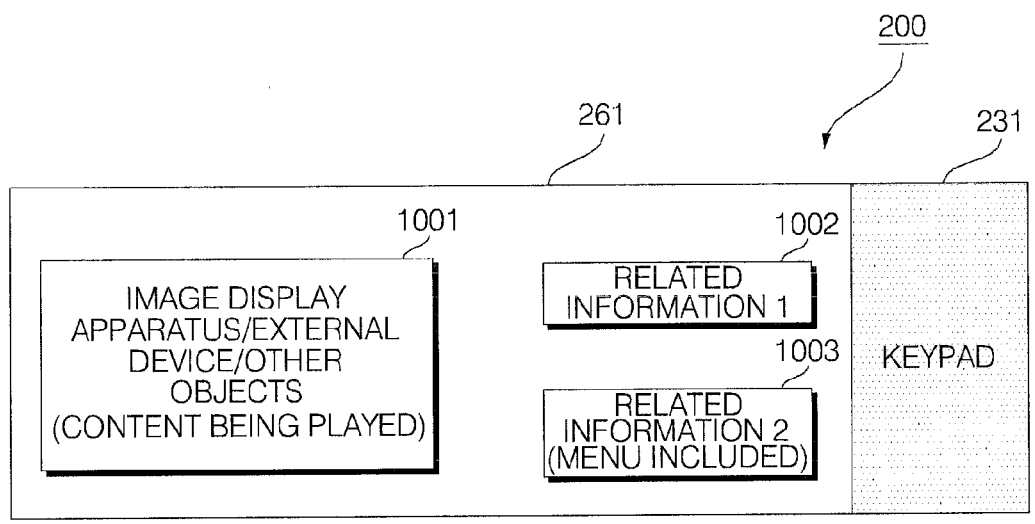
FIG. 7 illustrates an exterior of an augmented remote controller according to an exemplary embodiment of the present invention.

FIG. 7 illustrates an exterior of the augmented remote controller 200 according to an exemplary embodiment of the present invention.

As shown in FIG. 7, a screen 261 displayed on the display 260 of the augmented remote controller 200 may include an object 1001 identified by the augmented remote controller 200 and object-related information 1002 and 1002, which is information about the identified object 1011.

In this exemplary embodiment, the object 1001 identified by the augmented remote controller 200 is a real image of an object captured by the camera of the augmented remote controller 200. The object-related information 1002 and 1003 is augmented information including information detected by the augmented remote controller 200. As shown in FIG. 7, the augmented remote controller 200 may display the augmented information together with the real image of the object on the screen 261. The user may identify or determine information regarding the captured object from the augmented information included in the screen 261.

The object-related information may include a menu for controlling the object. In the exemplary embodiment, the second object-related information 1003 (related information 2) may be a menu by which a related command is input to the image display apparatus 100 or the external device 30. The related information 2 may also be a menu by which the current playback of a content is discontinued or the content is transmitted to another electronic device.

When the screen 261 is displayed on a touch screen, the user may select the object-related information 1002 and 1003 on the screen 261 by touching the touch screen. Additionally, the user may enter a command corresponding to a particular icon to the augmented remote controller 200 by selecting the icon in the menu included in related information 2 displayed on the screen 261.

The augmented remote controller 200 may include a keypad 231. The user may enter a particular command to the augmented remote controller 200 by manipulating a predetermined key of the keypad 231.

Figure 8:
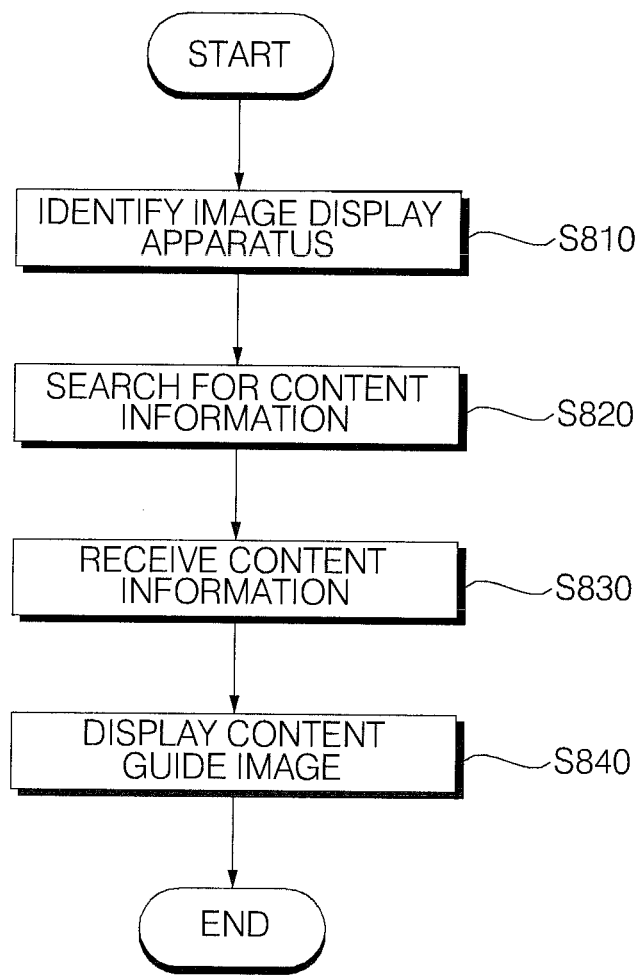
FIG. 8 is a flowchart illustrating a method for operating an augmented remote controller according to an exemplary embodiment of the present invention.

FIG. 8 is a flowchart illustrating a method for operating an augmented remote controller according to an exemplary embodiment of the present invention. Other operations, orders of operations and embodiments are also within the scope of the present invention.

As shown in FIG. 8, the augmented remote controller 200 may identify or determine, in operation S810, the image display apparatus 100 connected to the home network 40 through the identification unit 250. While the augmented remote controller 200 identifies or determines the image display apparatus 100 as an object herein, it is a mere exemplary application. The augmented remote controller 200 may identify or determine other objects including electronic devices capable of playing back contents, such as the external device 30 as well as the image display apparatus 100. The augmented remote controller 200 may also identify or determine an image displayed on the identified image display apparatus 100 or external device 30. The image may be a still image or video resulting from playing back a specific content, an EPG image, a channel browser image, and/or a channel list image. In this example, the augmented remote controller 200 may receive metadata related to the content being played back in the image display apparatus 100 from the image display apparatus 100 or the home server 50 connected to the image display apparatus 100 and identify or determine information related to the content based on the metadata.

According to the exemplary embodiment shown in FIG. 8, the augmented remote controller 200 may identify the image display apparatus 100 or one or more external devices connected to the home network 40 by the identification unit 250. The augmented remote controller 200 may identify or determine an object using an identification device such as a camera or an RFID reader. For example, if the camera of the augmented remote controller 200 points to the image display apparatus 100, the augmented remote controller 200 may identify the image display apparatus 100.

An operation for identifying or determining an external device may be performed along with an operation for generating a preview image by capturing the external device in the augmented remote controller 200. Accordingly, the augmented remote controller 200 may include the identification unit 250 such as a module for identifying an object, generating a preview image of the object, capturing an image, and storing the captured image. The augmented remote controller 200 may also include the display 260 for displaying and storing the preview image or stored image in real time.

The identification unit 250 of the augmented remote controller 200 may identify or determine an external device by an RFID tag. The augmented remote controller 200 may read or acquire external device identification information such as the serial number or product code of the external device. The augmented remote controller 200 may also use image data generated by capturing the external device to identify the external device. The image data may be streamed preview image data or image data that has been captured and stored.

The augmented remote controller 200 may search, in operation S820, for information regarding a content to be played back in the image display apparatus 100 (hereafter referred to as content information). A searched database, in which the content information is searched, may be stored in the image display apparatus 100 or in a server accessible to the augmented remote controller 200 over a wireless communication network. The server may be the above-described network server 300 or home server 40, for example. If the content is a video received from a broadcasting station, the broadcasting station may transmit the content information along with the content to the image display apparatus 100 or the augmented remote controller 200.

The determined content information may be customized for the user of the image display apparatus 100. That is, content information edited or amended to be suitable for the user of the image display apparatus 100 from among the content information regarding the image display apparatus 100 may be a target to be searched for and received. Personalized content information and an associated personalized content guide image may be described below in detail with reference to FIG. 9.

The augmented remote controller 200 may receive the determined content information through the wireless communication module 210 in operation S830. If the augmented remote controller 200 detects or determines the content information from the content information database stored in the network server 300 or the home server 50, the augmented remote controller 200 may download the content information from the network server 300 or the home server 50.

The controller 280 of the augmented remote controller 200 may generate a content guide image based on the received content information. The display 260 of the augmented remote controller 200 may then display the content guide image in operation S840. Along with the content guide image, an image of the identified image display apparatus 100 and an image corresponding to the content being played back in the image display apparatus 100 may be displayed on the display 260.

Figure 9:
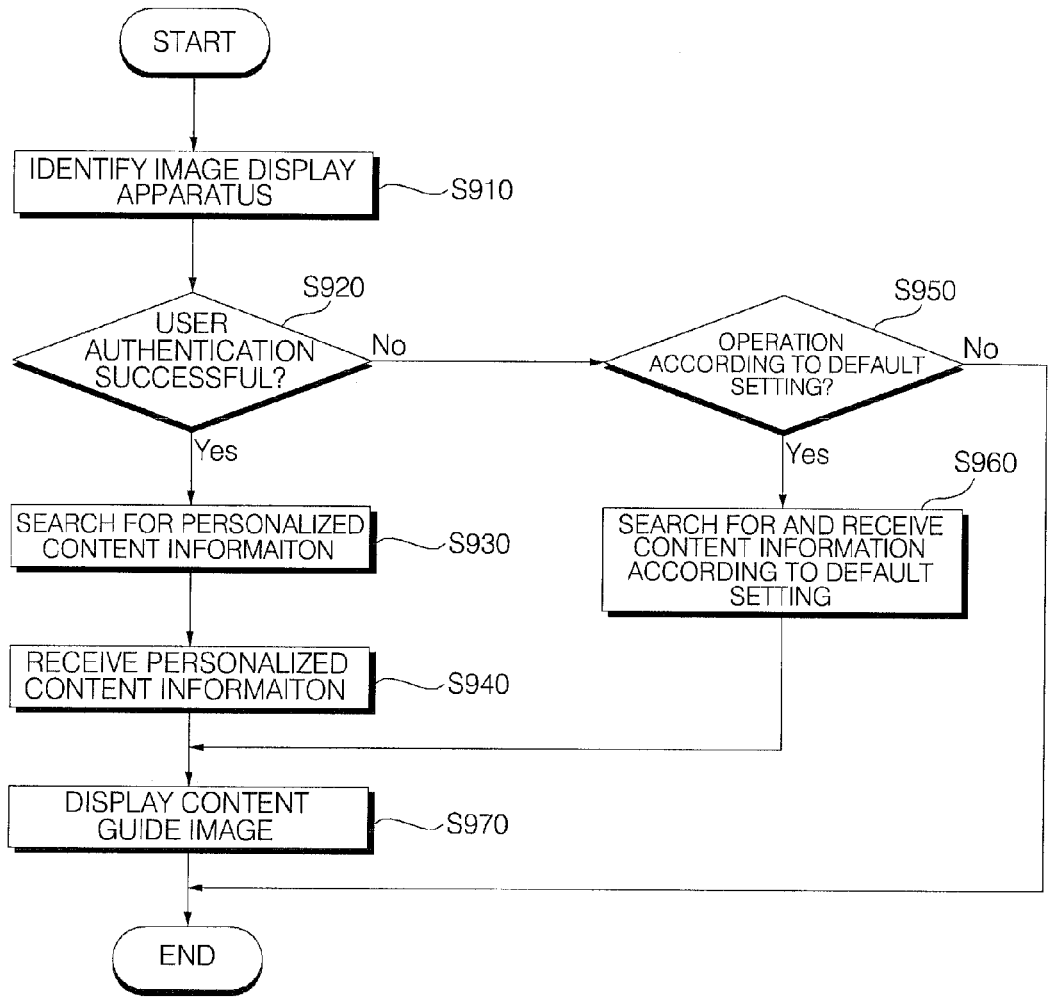
FIG. 9 is a flowchart illustrating a method for operating an augmented remote controller according to an exemplary embodiment of the present invention.

FIG. 9 is a flowchart illustrating a method for operating an augmented remote controller according to an exemplary embodiment of the present invention. Other operations, orders of operations and embodiments are also within the scope of the present invention.

As shown in FIG. 9, the augmented remote controller 200 may identify or determine the image display apparatus 100 by the sensor unit 240 or the identification unit 250 (S910). Since the method or operation for identifying or determining an electronic device by the augmented remote controller 200 has already been described with reference to FIG. 8, a further description may not be provided. The augmented remote controller 200 may identify or determine a user of the image display apparatus 100 as well as the image display apparatus 100, by use of the sensor unit 240 or the identification unit 250. As the augmented remote controller 200 identifies the user, it may authenticate the user. The user authentication is a process of determining whether a person that is using or wants to use the image display apparatus 100 is a pre-registered user. Therefore, a decision may be made as to whether the user of the image display apparatus 100 is a pre-registered or an authorized user by the user authentication. If two or more persons are registered as users of the image display apparatus 100, the user authentication may involve a process of determining which one a current user is.

The user authentication may be carried out in various manners. For example, the augmented remote controller 200 may identify or determine a face of a user by the camera of the identification unit 250. That is, the augmented remote controller 200 may generate image data regarding the face of the user. The augmented remote controller 200 may search for a user matching a pattern of the face by comparing the image data about the face of the user with image data about users' faces stored in a database, thus performing the user authentication. In the presence of the matching image data, the user authentication may be successful. On the other hand, in the absence of the matching image data, the user authentication may fail.

Alternatively or additionally, a predetermined signal (such as a password) may be used for the user authentication. More specifically, the augmented remote controller 200 may receive a password from a user through the user interface 230, the sensor unit 240, and/or the identification unit 250 in advance and store the password in the storage 220. Thereafter, upon receipt of a security signal from the user through the user interface 230, the sensor unit 240, and/or the identification unit 250, the controller 280 may compare the received security signal with the stored password. Only if the received security signal is identical to the stored password, the controller 280 may determine that the user authentication is successful.

Besides a text signal (such as a security number or password), the security signal may take the form of a voice signal, a finger print image, and/or the like. The same thing may apply to the pre-stored password. Voice-based user recognition may include both authenticating a user by analyzing voice features of the user and authenticating a user by recognizing a message that the user tells. The controller 280 of the augmented remote controller 200 may carry out user authentication by finger print recognition, iris recognition, voice recognition, and/or user's gesture sensing.

If the user authentication is successful in operation S920, the augmented remote controller 200 may search, in operation S930, for personalized content information which is related to the image display apparatus 100 or a content being played back in the image display apparatus. For example, the augmented remote controller 200 may search for information regarding a preferred channel registered by the user or information regarding a channel set for the user. When the user has already set an information category from among information available as content information, only content information that falls into the category may be searched for. For example, it is assumed that contents are stored in the image display apparatus 100 and the user has designated file format, file name, and saved date as search categories. In this example, when the augmented remote controller 200 searches for content information after the user authentication, the augmented remote controller 200 may search only information about file formats, file names, and saved dates of the stored contents.

The augmented remote controller 200 may search for appropriate content information according to the identified image display apparatus 100, success or failure of the user authentication, and/or the identified user, and then receive search results in operation S940.

If the user authentication fails in operation S920, an operation of the image display apparatus 100 or the augmented remote controller 200 may end, while a function not related to the personalized information may continue in operation S950. For example, the augmented remote controller 200 may provide the user that has failed in the user authentication with content information according to a default setting, irrespective of personalized settings for the user. Thus content information that the user has set as locked (or in a locked status) and content information that the user has not requested are not provided. In FIG. 9, when the user authentication fails, the augmented remote controller 200 may search for content information according to the default setting and receive search results in operation S960.

The augmented remote controller 200 may display, in operation S970, a content guide image based on the received content information. When searching for and receiving personalized content information after the user authentication, the augmented remote controller 200 may provide a personalized content guide image. The arrangement of the content information included in the content guide image or settings of the content guide image as well as the content information itself may vary according to the user's personalized information. The augmented remote controller 200 may display, on the display 260, information about a preferred channel set for the user or information regarding a channel released from a locked state.

The above operation may be summarized, by an example. If the image display apparatus 100 is displaying an EPG or a channel browser, the augmented remote controller 200 may identify the displaying of the EPG or channel browser in the image display apparatus 100 and search for personalized data related to the EPG or the channel browser. In an exemplary embodiment, personalized data may be information regarding preferred contents registered according to the user, or information regarding locked content or unlocked contents for the user. Accordingly, the personalized data related to the EPG or the channel browser may be information regarding a preferred channel set for the user or a channel set as locked or released from the locked state. After the user authentication by face recognition, etc. for example, the augmented remote controller 200 may display, on the display 260, information regarding a preferred channel set by the user or information regarding a channel set to be displayed for the user.

Figure 10:
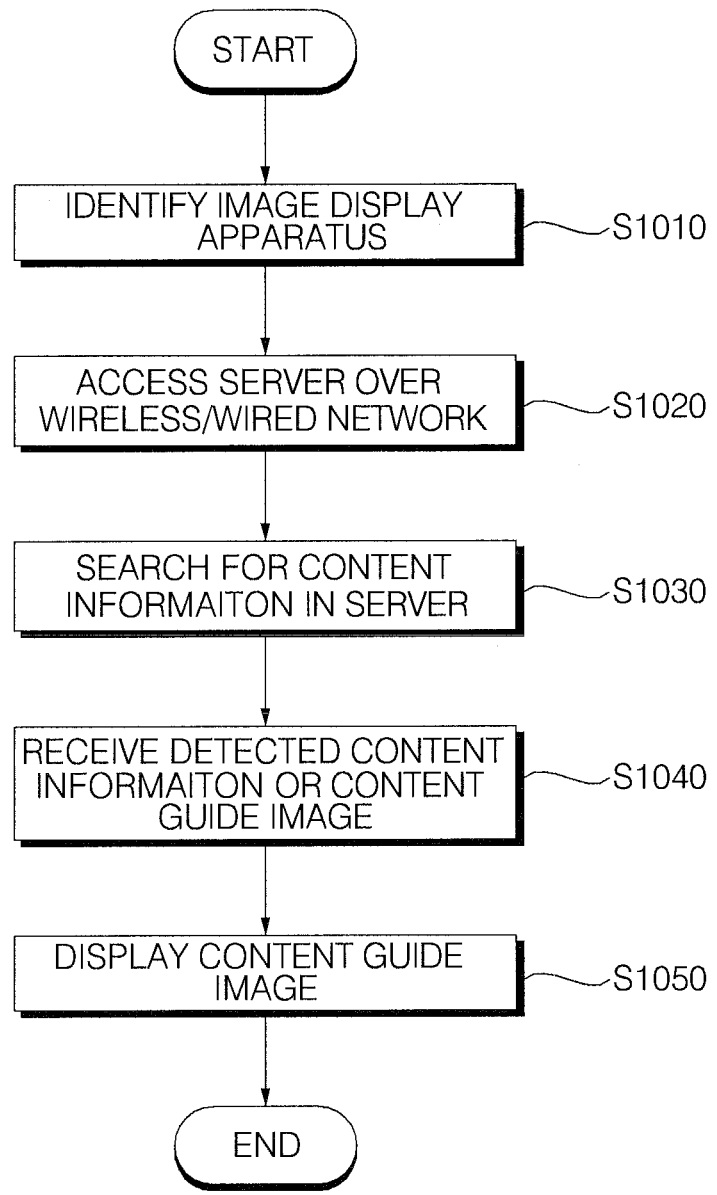
FIG. 10 is a flowchart illustrating a method for operating an augmented remote controller according to an exemplary embodiment of the present invention.

FIG. 10 is a flowchart illustrating a method for operating an augmented remote controller according to an exemplary embodiment of the present invention. Other operations, orders of operations, and embodiments are also within the scope of the present invention.

As shown in FIG. 10, the augmented remote controller 200 may identify or determine, in operation S1010, the image display apparatus 100 by using the sensor unit 240 or the identification unit 250. Before searching for content information, the augmented remote controller 200 may access a server over a wired/wireless communication network in operation S1020. Therefore, the access to the server may be carried out by the wireless communication module 210 of the augmented remote controller 200. The server may be the network server 300 or the home server 50.

If the augmented remote controller 200 accesses the network server 300, the wireless communication module 210 may be connected to the network server 300 over an IP network. If the augmented remote controller 200 accesses the home server 50, the wireless communication module 210 may be connected to the home server 50 over the home network 40. It is assumed that a database of content information may be stored in the network server 300 or the homer server 50.

After accessing the server, the augmented remote controller 200 may search, in operation S1030, for content information related to the identified image display apparatus 100. If a user has already been identified or authenticated, the controller 280 of the augmented remote controller 200 may search for personalized content information for the user. Identification information of the identified image display apparatus 100 and/or identification information of the user may be used in searching for the content information or the personalized content information. Additionally, if there is a past history of searching for content information and displaying a content guide image in relation to the same image display apparatus 100 and/or the same content, the previous content guide image may exist in the database of content information. In this example, the augmented remote controller 200 may search for and receive the same content guide image.

The augmented remote controller 200 may receive, in operation S1040, the detected content information, the personalized content information, and/or the content guide image through the wireless communication module 210. The augmented remote controller 200 may display, in operation S1050, the content guide image based on the received information on the display 260.

Figure 11:
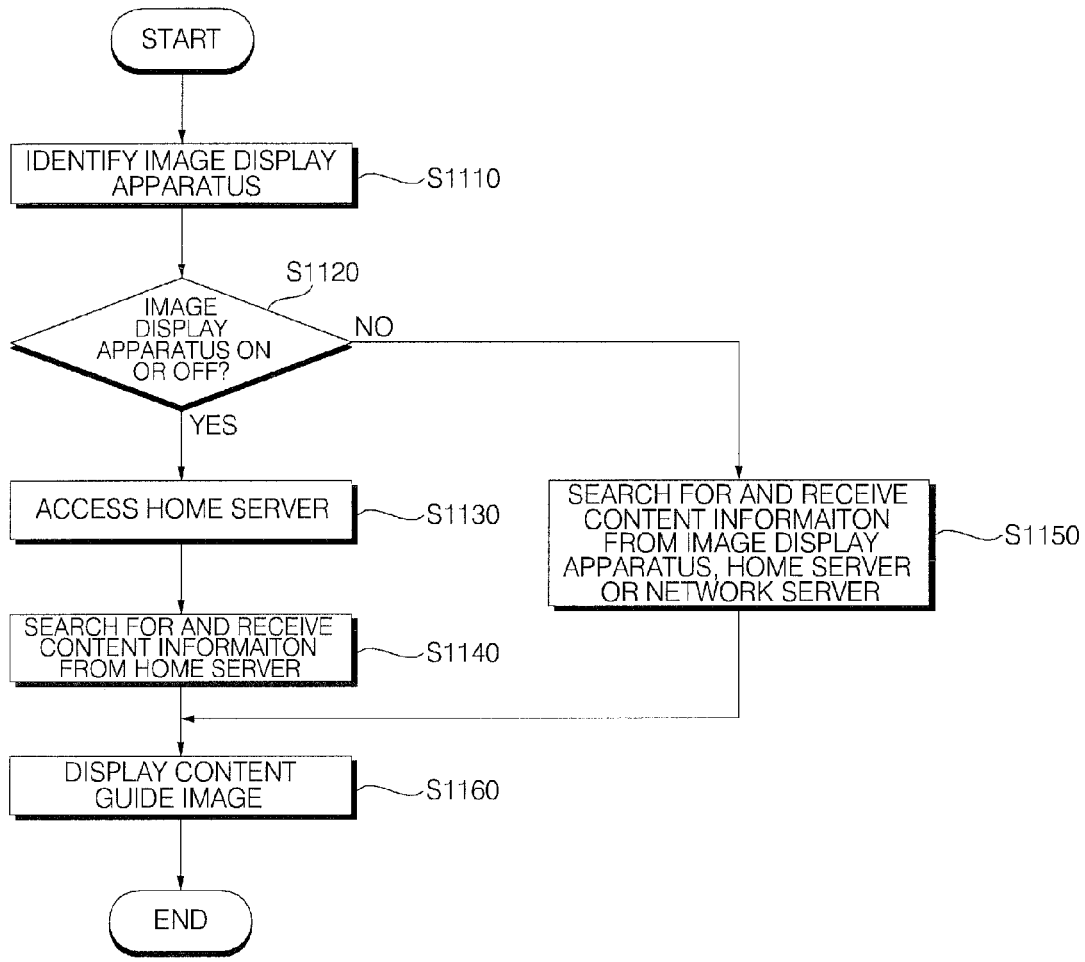
FIG. 11 is a flowchart illustrating a method for operating an augmented remote controller according to an exemplary embodiment of the present invention.

FIG. 11 is a flowchart illustrating a method for operating an augmented remote controller according to an exemplary embodiment of the present invention. Other operations, orders of operations, and embodiments are also within the scope of the present invention.

As shown in FIG. 11, the augmented remote controller 200 may identify or determine, in operation S1110, the image display apparatus 100 by using the sensor unit 240 or the identification unit 250.

The augmented remote controller 200 may determine, in operation S1120, whether the image display apparatus 100 is on or off. It may be determined in various manners whether the image display apparatus 100 is on or off. For example, in absence of a signal received from the image display apparatus 100 or in absence of metadata received through the image display apparatus 100, the augmented remote controller 200 may determine that the image display apparatus 100 is off. To determine that the image display apparatus 100 is off in the example where non-signal transmission and reception lasts for a predetermined time or longer, a timer may be used. The augmented remote controller 200 may determine the power-off of the image display apparatus 100 by analyzing an image of the image display apparatus 100 captured by the camera. The determination as to the power-on or the power-off of the image display apparatus 100 may also be made through the home server 50.

In the example of the power-off of the image display apparatus 100, the augmented remote controller 200 may access the home server 50 through the wireless communication module 210 in operation S1130. In this exemplary embodiment, the augmented remote controller 200 may search for content information for a user of the image display apparatus 100 in the power-off state in the home server 50. The content information is information regarding a content played back in the image display apparatus 100. This content information may be personalized information for the user that has been identified or authenticated. A user identification operation may be performed before accessing the server. The augmented remote controller 200 may search for the content information in the home server 50 and receive the determined content information from the homer server 50 in operation S1140. If the image display apparatus 100 is powered-on, the augmented remote controller 200 may search for the content information through the image display apparatus 100 in operation S1150. The content information may be searched for through the home server 50 or the network server 300 in operation S1150.

Upon receipt of the content information for the user from the image display apparatus 100 or the home server 50, the controller 280 of the augmented remote controller 200 may create a content guide image using the received content information and the display 260 may display the content guide image in operation S1160.

That is, the personalized information related to the image display apparatus 100 in the power-off state may be information regarding the content played back in the image display apparatus 100. For example, the content information may be information regarding a preferred channel in the image display apparatus 100 or information regarding a history of contents played back in the image display apparatus 100.

The augmented remote controller 200 may display the detected information on the display 260. Accordingly, the user may identify the personalized information related to the image display apparatus 100 without turning it on, even if the image display apparatus 100 is off.

Figure 12:
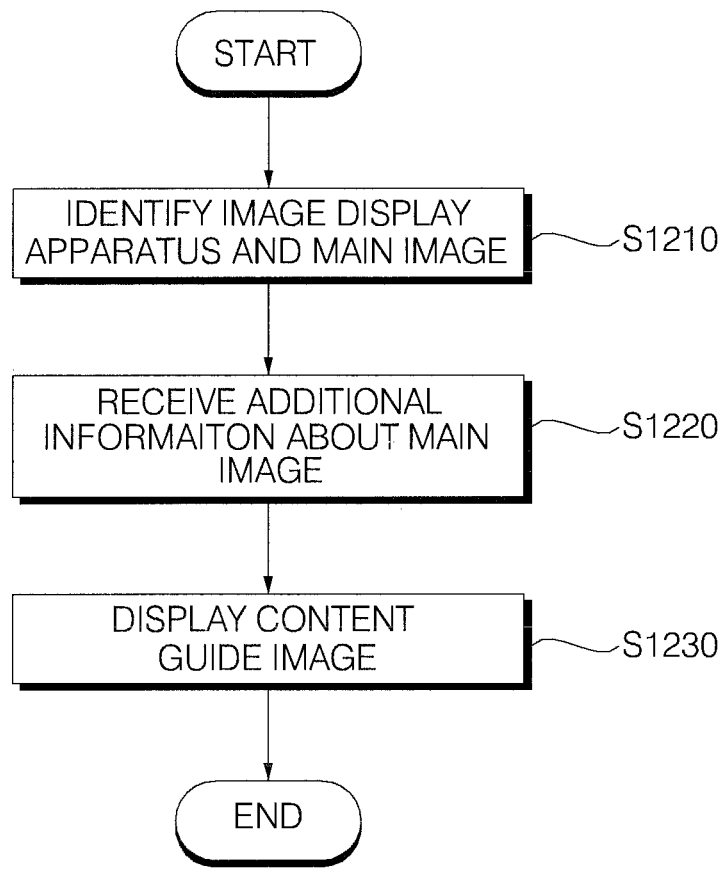
FIG. 12 is a flowchart illustrating a method for operating an augmented remote controller according to an exemplary embodiment of the present invention.

FIG. 12 is a flowchart illustrating a method for operating an augmented remote controller according to an exemplary embodiment of the present invention. Other operations, orders of operations, and embodiments are also within the scope of the present invention.

As shown in FIG. 12, the augmented remote controller 200 may identify or determine, in operation S1210, the image display apparatus 100 and a main image by using the identification unit 250 or the sensor unit 240. The main image may be an image displayed during playing back a content in the image display apparatus 100, or may be a user interface image such as a channel list image or an EPG image.

Identifying a main image may mean identifying a content being played back at a moment that the image display apparatus 100 is identified. The content may be a multimedia content including a video or both a video and an audio. The augmented remote controller 200 may generate a preview image simultaneously with capturing the image display apparatus 100 that is displaying a main image by playing back a content, or storing the image of the image display apparatus 100, during identifying the image display apparatus 100 and the main image.

The image display apparatus 100 may be identified in various manners. The augmented remote controller 200 may receive metadata related to the main image from the image display apparatus 100. The augmented remote controller 200 may also identify or determine the main image by receiving metadata related to the content corresponding to the main image or metadata related to the user interface image from a broadcasting station that transmits the content or the user interface image, and/or from the network server 300.

The augmented remote controller 200 may receive, in operation S1220, additional information regarding the main image that has been identified together with the image display apparatus 100, through the wireless communication module 210. The additional information regarding the main image may be received from the image display apparatus 100, the broadcasting station that transmits the content corresponding to the main image, the network server 300, and/or the home server 50. To receive the additional information, the augmented remote controller 200 may transmit a signal requesting the additional information regarding the content to the image display apparatus 100, the network server 300, the broadcasting station, etc.

The additional information may specify at least one of the sound features, aspect ratio, image quality, genre, title, synopsis, characters, and play time of the content. The additional information may also provide a channel list that lists channels on a time zone basis, on which multimedia contents are transmitted often to the image display apparatus 100. The additional information may further provide a list of channels that are often transmitted in a current time zone or a list of preferred channels in the current time zone.

Upon receipt of the additional information regarding the content, the augmented remote controller 200 may display, in operation S1230, a content guide image including the additional information. The content guide image may be displayed together with the main image on the display 260.

When the augmented remote controller 200 identifies the image display apparatus 100 that is displaying an image based on a video signal received from a broadcasting station, the augmented remote controller 200 may identify a user and display an EPG or a channel browser for the identified user on the display 260. The EPG or channel browser for the user may be information personalized for the user.

That is, the augmented remote controller 200, which has identified a content based on a broadcast signal as an object, may identify a user, and display an EPG or channel browser for the user authenticated by user authentication. The EPG or channel browser for the user may be an EPG configured to display user-preferred information or a channel browser with information about user-preferred channels.

Figure 13:
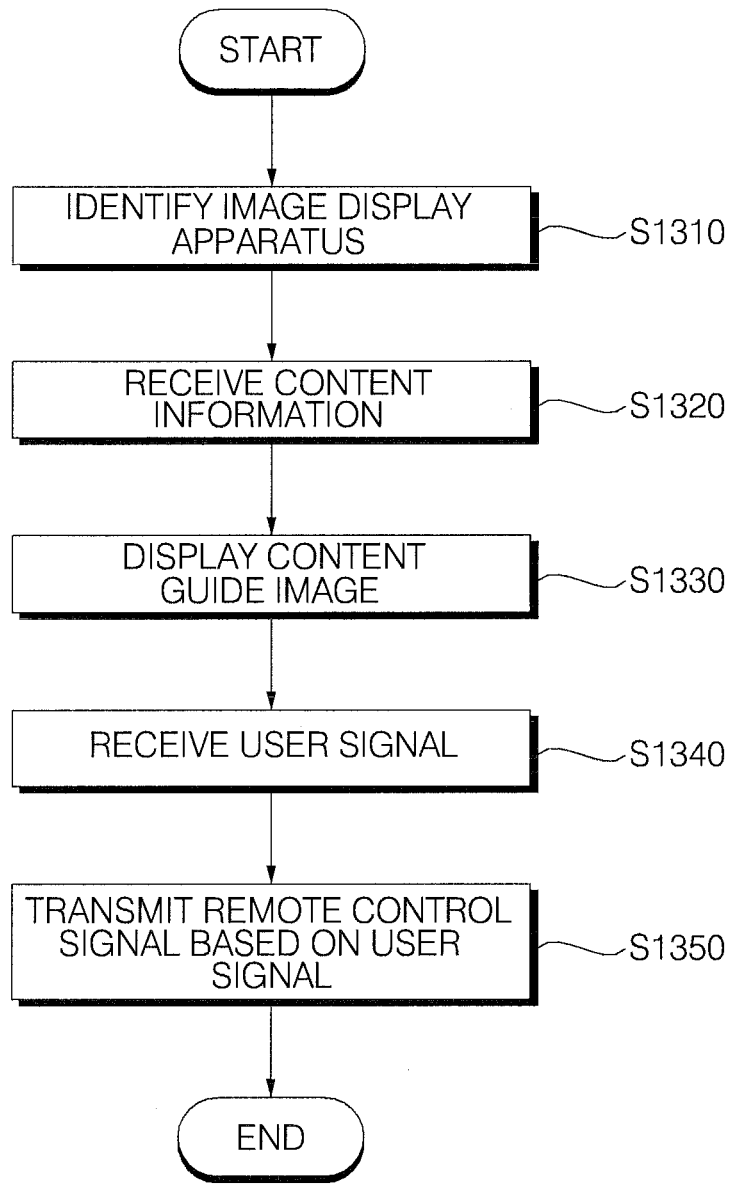
FIG. 13 is a flowchart illustrating a method for operating an augmented remote controller according to an exemplary embodiment of the present invention.

FIG. 13 is a flowchart illustrating a method for operating an augmented remote controller according to an exemplary embodiment of the present invention. Other operations, orders of operations and embodiments are also within the scope of the present invention.

As shown in FIG. 13, the augmented remote controller 200 may identify or determine, in operation S1310, the image display apparatus 100, may receive content information in operation S1320, and may display a content guide image in operation S1330. An operation of the augmented remote controller 200 for identifying the image display apparatus 100 and displaying the content guide image for the user based on the content information has been described, and thus may not be further described.

The content guide image may function as a user interface image. Accordingly, the user may input a specific signal such as a user command according to what is displayed or indicated in the content guide image so as to control the augmented remote controller 200 and/or the image display apparatus 100.

The user may enter a user signal according to the content guide image. Thus, the augmented remote controller 200 may receive the user signal through the user interface 230 in operation S1340. The augmented remote controller 200 may generate a remote control signal according to the user signal and transmit the remote control signal to the image display apparatus 100 in operation S1350.

If the content guide image provides a channel list or an EPG, upon input of a user signal to select a channel or a program, the controller 280 of the augmented remote controller 200 may generate a remote control signal based on the user signal and transmit the remote control signal to the image display apparatus 100. The image display apparatus 100 may change a channel or select a program based on the remote control signal.

FIGS. 14 to 17B illustrate content guidance images displayed in an augmented remote controller according to exemplary embodiments of the present invention. Other embodiments may also be provided.

Figure 14:
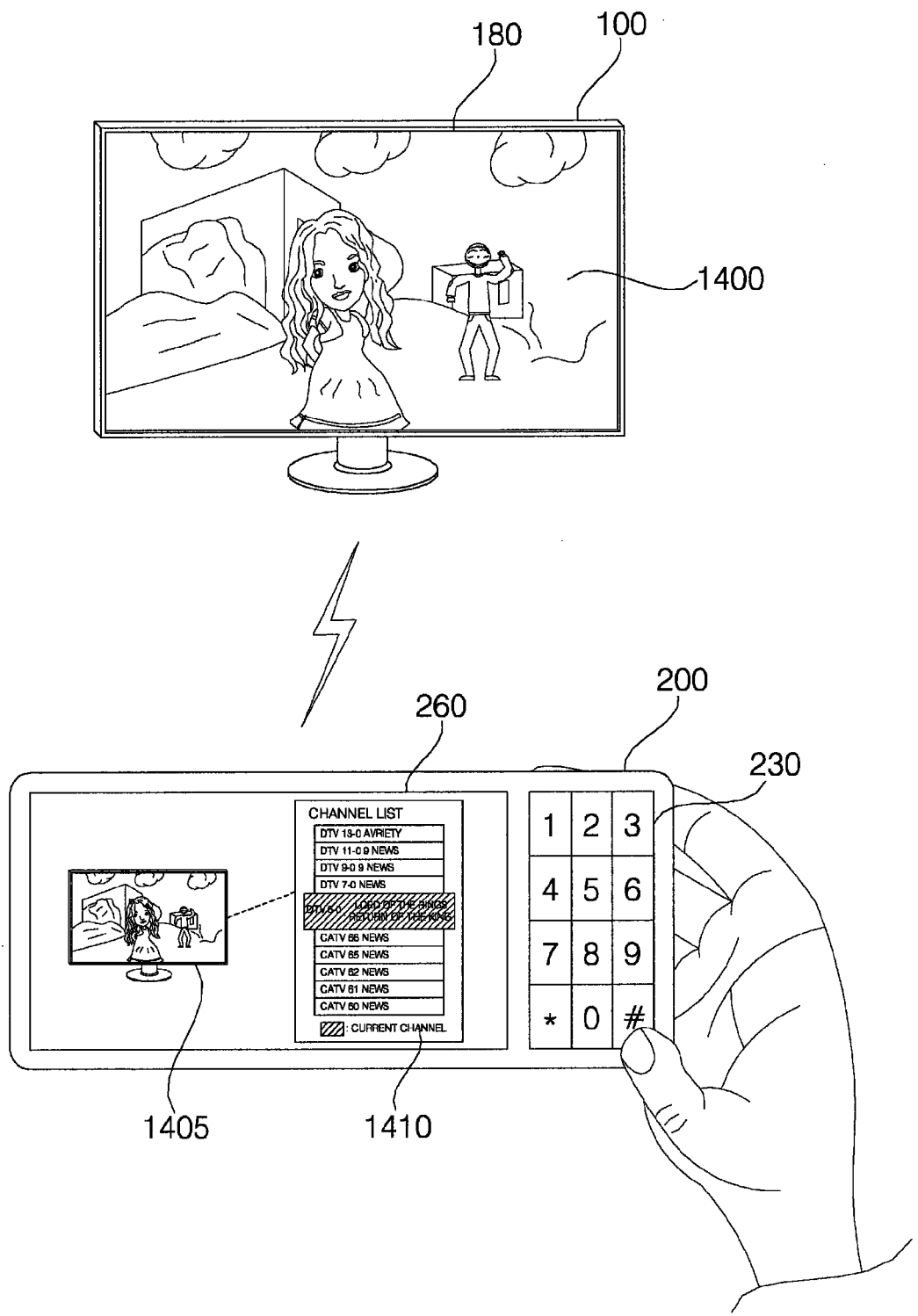
FIGS. 14 to 17B illustrate content guide images displayed in an augmented remote controller according to exemplary embodiments of the present invention.

As shown in FIG. 14, the augmented remote controller 200 may display a channel list image 1410 as a content guide image.

The image display apparatus 100 may be playing a specific content and thus a main image 1400 may be displayed on the display 180. As the augmented remote controller 200 identifies the image display apparatus 100, the augmented remote controller 200 may display an image 1405 of the image display apparatus 100 and the channel list image 1410 as the content guide image on the display 260.

The channel list image 1410 may be a user interface image that provides a list of a channels transmitting the current content, channels adjacent to the current channel, and/or similar channels. The channel that is broadcasting the current content may be indicated by an indication 'current channel' in the channel list image 1410.

In the example where a user authentication is performed along with identification of the image display apparatus 100, the channel list image 1410 may provide channel list information edited based on personalized information for the authenticated user. For example, in presence of different preferred channel information registered for different users, when one of the users is authenticated, the augmented remote controller 200 may display a list of preferred channels registered by the user as content information. If different content information is stored for users and a locking function is set, the authenticated user may prevent other users from viewing information registered by the user.

Figure 15:
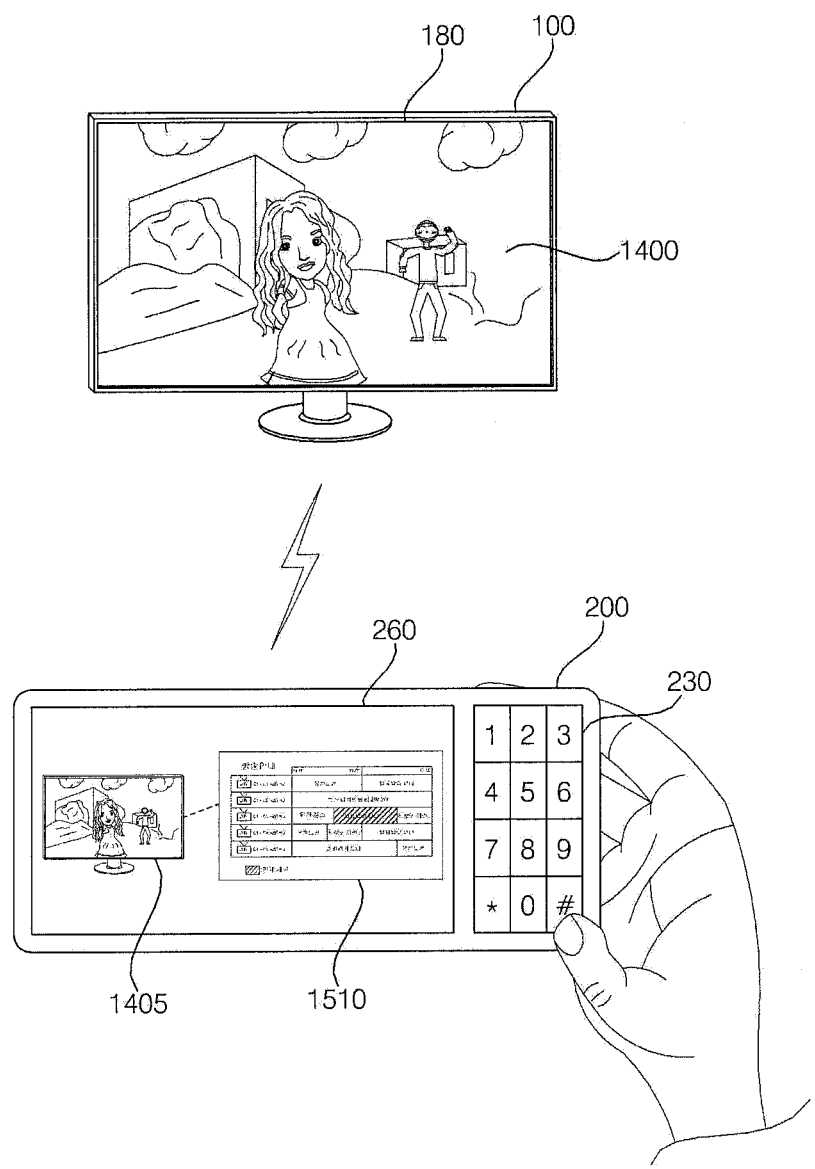

FIG. 15 illustrates an EPG image displayed as a content guide image by the augmented remote controller 200 according to an exemplary embodiment of the present invention.

As shown in FIG. 15, the augmented remote controller 200 may display an EPG image 1510 as a content guide image.

It is assumed that the image display apparatus 100 is playing a specific content and the content is a broadcast program received from a broadcasting station. In this example, a broadcast image is displayed as the main image 1400 on the display 180. As the augmented remote controller 200 identifies or determines the image display apparatus 100, the display 260 of the augmented remote controller 200 may display the image 1405 of the image display apparatus 100 and the EPG image 1510 as the content guide image.

The EPG image 1510 may be a program guide image including information regarding the broadcast program corresponding to the broadcast content displayed as the current main image 1400.

To provide personalized EPG information to a user, the user may be authenticated in advance. The user authentication is a process of determining whether the user has been registered or identifying the user from among registered users. Thus only an authorized user can receive content information based on the personalized information. The user may use a content guide image mainly with information edited to increase the user's convenience through the user authentication.

The authenticated user may receive an EPG image that has been edited according to the personalized information. That is, the augmented remote controller 200 may create an EPG image based on the personalized information for the user. For example, when the user registers a time zone or a preferred channel whose information is to be included in an EPG image, the augmented remote controller 200 may search for and collect content information based on the registered time zone or preferred channel and thus generate an EPG image using the collected content information. A broadcast program corresponding to a current content being broadcast may be indicated by an indication 'current program' in the EPG image 1510.

Figure 16A:
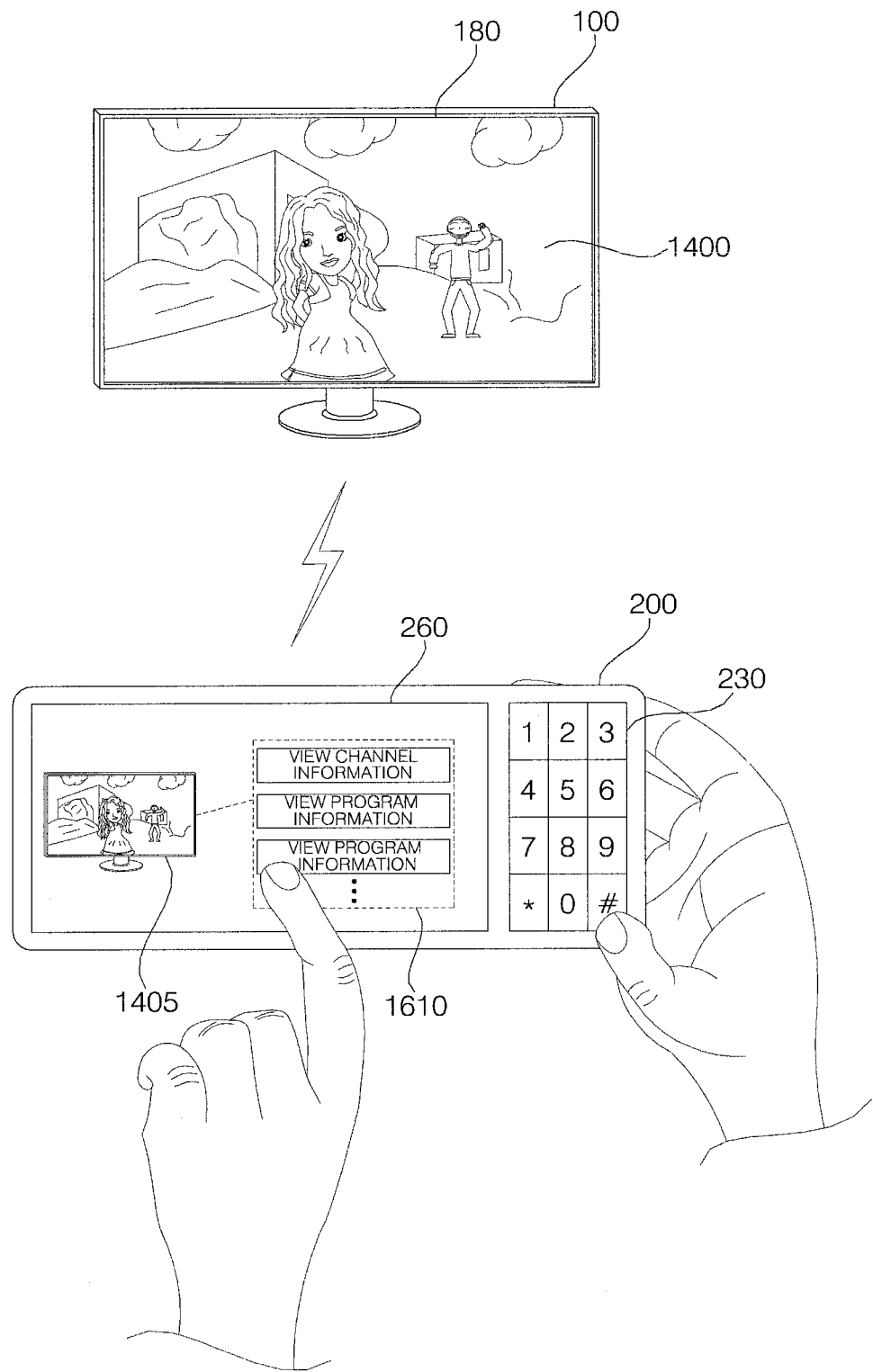
Figure 16B:
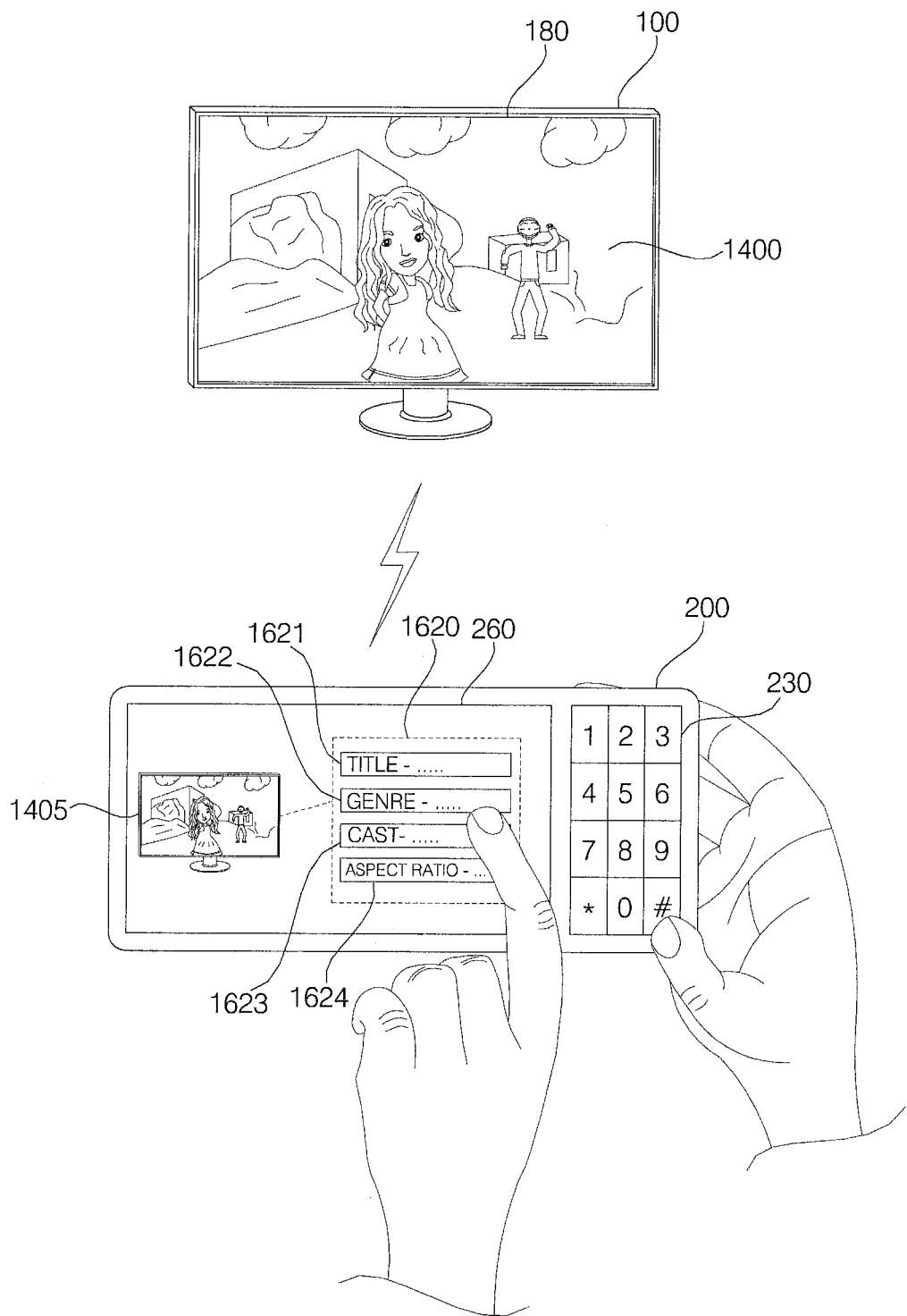
Figure 16C:
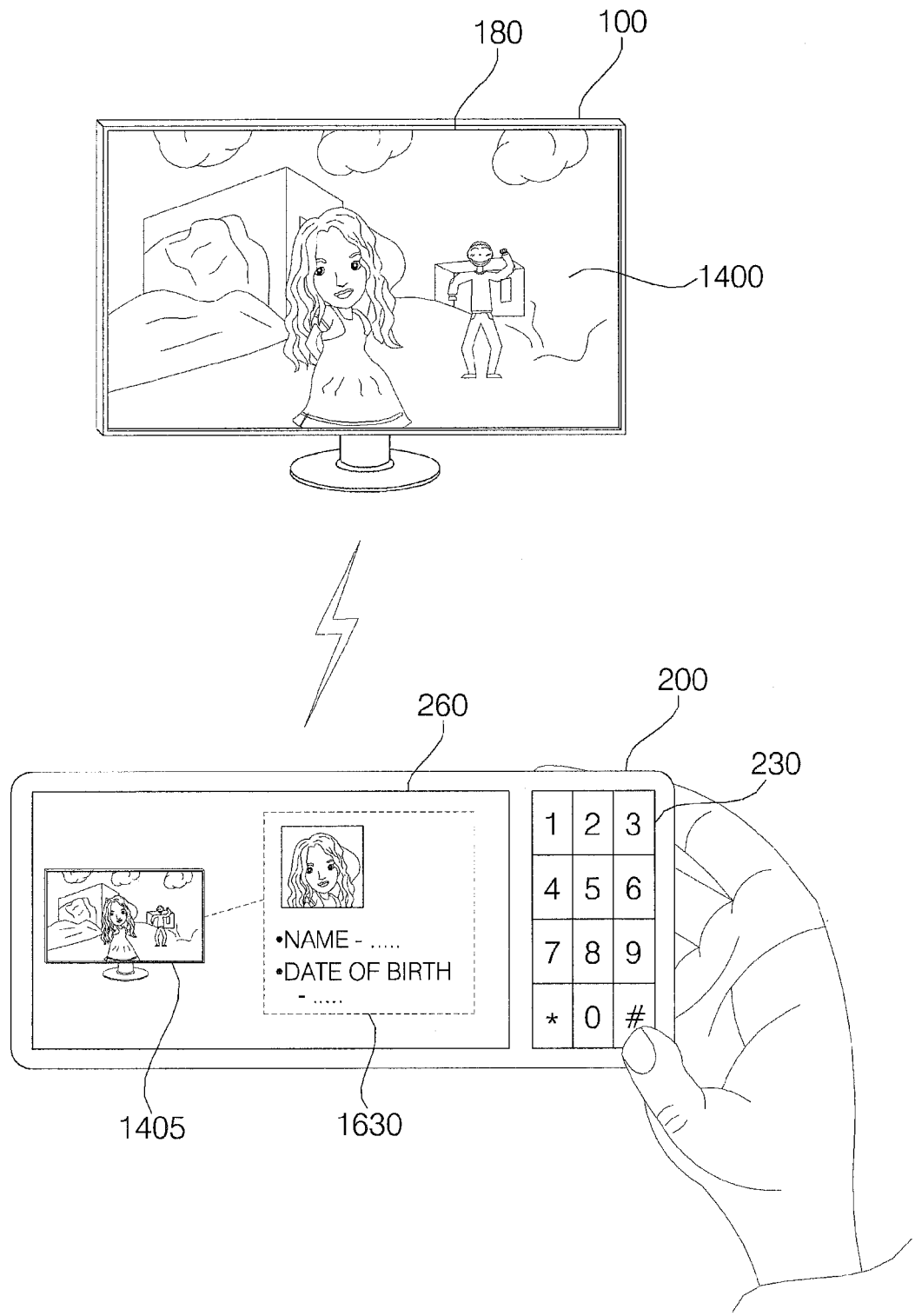

FIGS. 16A, 16B and 16C illustrate additional content information displayed in a content guide image by the augmented remote controller 200 according to exemplary embodiments of the present invention. A content may refer to a multimedia content being played in the image display apparatus 100.

As shown in FIGS. 16A, 16B and 16C, the augmented remote controller 200 may identify or determine the image display apparatus 100 and the main image 1400. Therefore, the augmented remote controller 200 may receive information about a content being played on the display 180 of the image display apparatus 100 from the image display apparatus 100, the broadcasting station, the network server 300 and/or the home server 50.

The augmented remote controller 200 may display, on the display S260, the image 1405 of the image display apparatus 100 that is displaying the main image 1400 as the content is played. Along with the image 1405, the augmented remote controller 200 may also display a user interface image 1610 to allow the user to select information to be received. The user interface image 1610 may include two or more available menu items, and more specifically 'view channel information', 'view program information', and 'view additional information'. In the example of FIG. 16A, the user has selected the menu item 'view additional information'.

If the current content is a broadcast program received from the broadcasting station, the augmented remote controller 200 may receive metadata related to the content directly from the broadcasting station or through the image display apparatus 100. To display additional content information, the augmented remote controller 200 may use the metadata related to the content in searching for content information.

The additional information displayed as the content information may be information regarding what the content is about, such as title (or name), genre, cast, etc. of the content, and/or information regarding attributes of the content such as an aspect ratio, sound setting information, etc. The augmented remote controller 200 may receive this information from the image display apparatus 100 or the broadcasting station. The augmented remote controller 200 may also acquire this information by searching for related information in a Web page in the network server 300. In this example, the augmented remote controller 200 may display more detailed additional content information based on the metadata related to the content or already obtained partial content information.

As shown in FIG. 16B, the display 260 may display a list 1620 of currently available additional information along with the image 1405 of the image display apparatus 100. The additional information list 1620 may include a title 1621, a genre 1622, a cast 1623, and an aspect ratio 1624. In FIG. 16B, the user has selected the cast 1623 in the additional information list 1620.

As shown in FIG. 16C, a content guide image 1630 may be displayed to provide additional cast information. The content guide image 1630 may have various forms of data as additional information. In FIG. 16C, when the user requests additional information about an actor, a photo of the actor or information about other shows or programs featuring the actor as a still image or a video. Various pieces of information about the actor may be provided as text data, and also along with voice data.

Figure 17A:
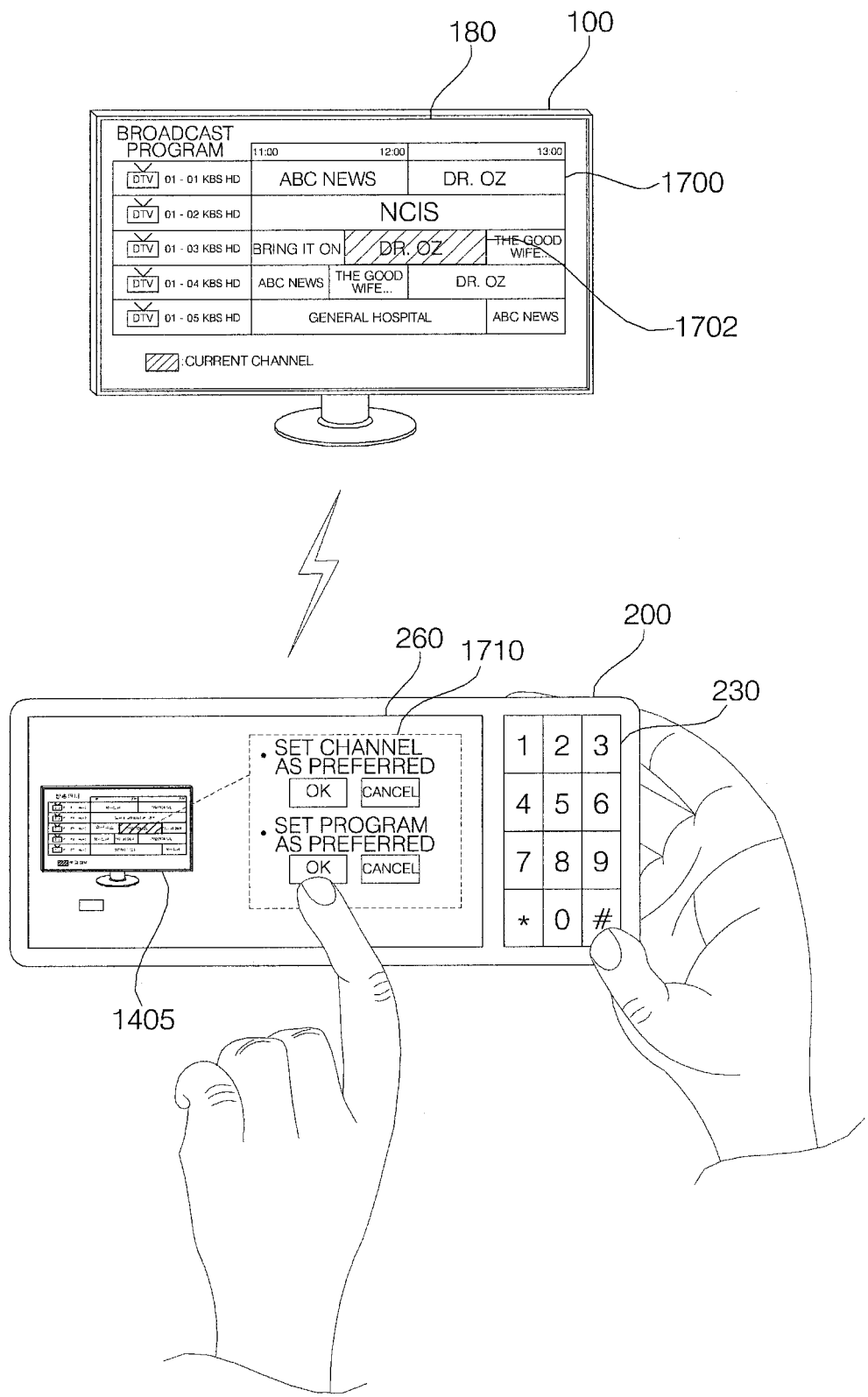
Figure 17B:
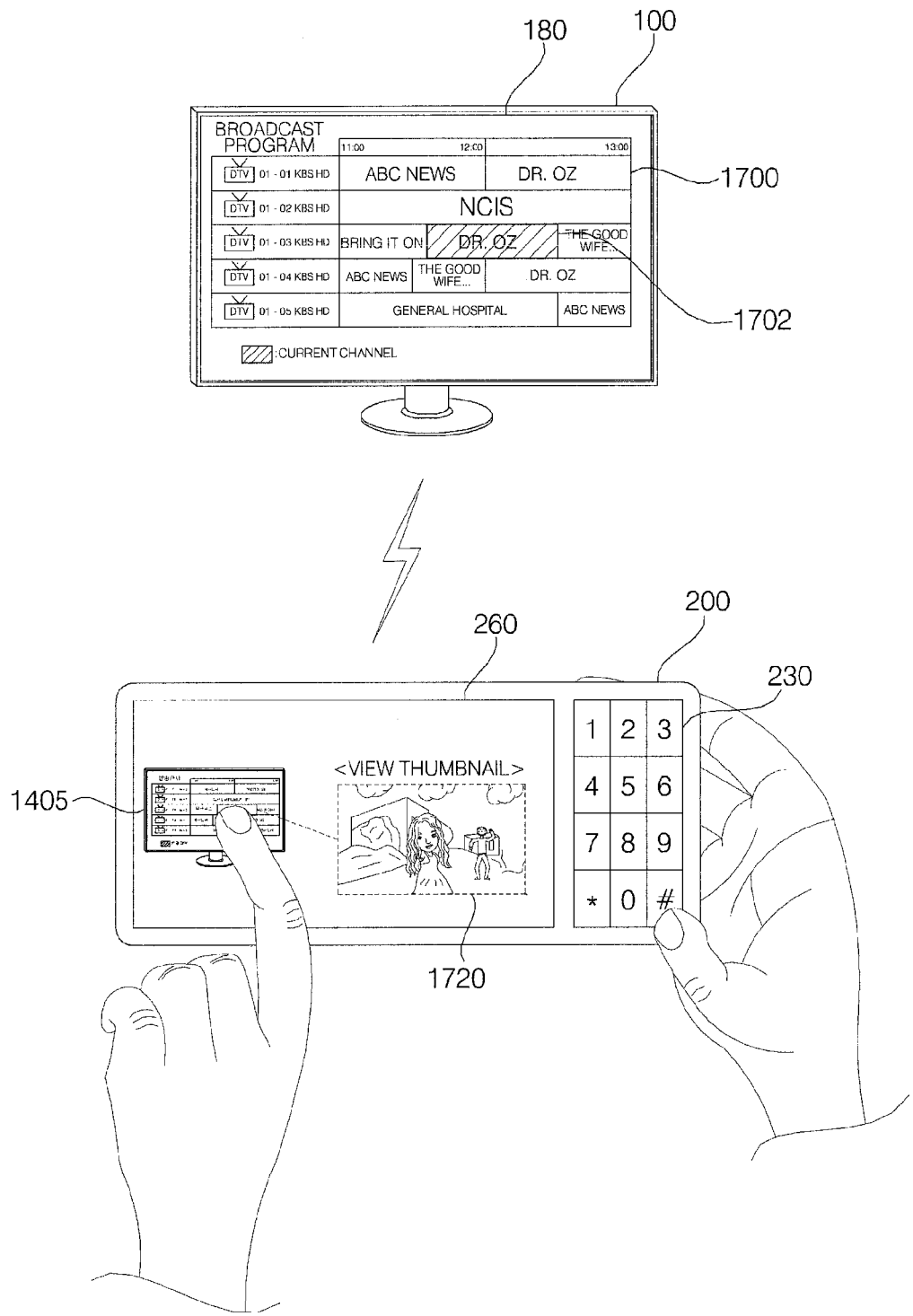

FIGS. 17A and 17B illustrate additional EPG information and a user interface image 1710 displayed as a content guide image by the augmented remote controller 200. An EPG image is displayed on the image display apparatus 100, which is a target device for the augmented remote controller 200.

A main image 1700 displayed on the image display apparatus 100 may result from playing a content. The main image 1700 may also be a user interface image provided to the user by the image display apparatus 100. The user interface image displayed as a main image may be a channel list image representing a list of channels available in the image display apparatus 100 or the EPG image 1700 that specifies TV programs received at the image display apparatus 100. With reference to FIGS. 17A and 17B, the EPG image 1700 as a user interface image being a main image may be described below.

Referring to FIGS. 17A and 17B, the augmented remote controller 200 may identify the image display apparatus 100 and a main image. The main image is the EPG image 1700. If the user wants to store personalized information or additional EPG information in relation to the EPG image 1700, the augmented remote controller 200 may provide the user interface image 1710. In FIG. 17A, the user may select one of the programs listed in the EPG image 1700 and register a channel of the selected program as a preferred channel or the selected program as a preferred program through the user interface image 1710. If the user registers the program as preferred, information indicating the registration of the program as preferred may be displayed as personalized EPG information of the EPG image 1700.

As shown in FIG. 17B, a content guide image displayed on the display 260 of the augmented remote controller 200 may represent additional EPG information. As in the above-described exemplary embodiments, the additional information may be content information. The additional EPG information may be provided in addition to a user interface image (such as an EPG image) and thus supplement information provided in the user interface image. Especially when personalized information is additionally provided for the user, the personalized information may be displayed as additional information.

For example, the additional EPG information may be user channel information regarding channels pre-registered by the user, channel category information indicating a user-preset channel category, and/or information regarding adjacent channels to a channel on which a main image is received. The user channel information may provide a list of channels registered according to tastes or needs of the user. For example, the user channel information may be information regarding a list of channels listed according to preferences of the user or information regarding channels that the user mainly enjoys at each time zone. The channel category information may indicate a genre of a broadcast program received on a channel or a genre of broadcast programs that the user mainly enjoys from among broadcast programs received on the channel.

Information regarding channels before and after a channel that transmits a broadcast program displayed as a main image may be provided as additional EPG information. Further, information regarding time zones in which the authenticated or identified user mainly use the image display apparatus 100 and information regarding channels that the user mainly views in the time zones may be displayed as additional EPG information on the display 260.

As the image 1405 of the image display apparatus 100 displaying the EPG image 1700 is displayed on the display 260, when the user selects a program or channel on the display 260, additional EPG information regarding the selected program or channel may be provided. Information indicating that the program or channel is a preferred program or channel pre-registered by the user and information regarding other programs or channels in a similar category to the program or channel are provided as the additional EPG information.

Additional EPG information may provide various pieces of information and take various forms. Meanwhile, in FIG. 17B, a thumbnail image 1720 of a program listed in the EPG image 1700 may be provided as additional EPG information. The user may select an intended program to view the thumbnail image 1720 on the display 260 of the augmented remote controller 200, or a thumbnail image 1720 may be generated for each program irrespective of user selection and thus all thumbnail images 1720 may be displayed on the display 260.

To display the thumbnail image 1720, the augmented remote controller 200 may detect or receive image information regarding programs listed in the EPG image 1700 and generate the thumbnail image 1720 by capturing a scene included in the intended program as a still image or a moving picture.

The user may input a user signal through the user interface 230 of the augmented remote controller 200 in order to view the thumbnail image 1720 or other additional information. If the augmented remote controller 200 is equipped with a touch screen function, the user signal may be input through the display 260.

As is apparent from the above description, an image display apparatus or an external device connected to the image display apparatus may be controlled by use of a single remote controller. Additionally, a user can efficiently use and manage contents played or stored in the image display apparatus or the external device connected to the image display apparatus, and information related to the contents.

Detailed information may be provided in addition to a user interface or content information provided through the image display apparatus. Personalized information may be provided to a user after user identification or authentication and security of the personalized information can be maintained.

A method for operating the augmented remote controller may be implemented as code that can be written on a computer-readable recording medium and may thus be read by a processor. The computer-readable recording medium may be any type of recording device in which data is stored in a computer-readable manner. Examples of the computer-readable recording medium may include a ROM, a RAM, a CD-ROM, a magnetic tape, a floppy disc, an optical data storage, and a carrier wave (e.g., data transmission through the internet). The computer-readable recording medium may be distributed over a plurality of computer systems connected to a network so that computer-readable code is written thereto and executed therefrom in a decentralized manner. Functional programs, code, and code segments needed for realizing embodiments herein may be construed by one of ordinary skill in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an image display apparatus on a remote controller based on augmented reality, the method comprising:

capturing, by a camera, an image of a real environment around the remote controller, the captured image of the real environment including the image display apparatus displaying a broadcast image of a channel;

identifying the image display apparatus connected to a network or located about the remote controller based on the captured image;

performing a user authentication by determining whether a user to use the image display apparatus is a pre-registered user;

searching, in the identified image display apparatus, for content information regarding the broadcast image and for content information that is personalized based on the user when the user is determined to be the pre-registered user and authenticated;

receiving the content information based on the searching for the content information; and displaying, on a touch screen of the remote controller, a content guide image based on the received content information while simultaneously displaying a real image, captured by the camera, of the identified image display apparatus, wherein the content information includes a plurality of channel items, and a current channel item corresponding to the broadcast image displayed in the image display apparatus is highlighted in the content guide image.

2. The method according to claim 1, further comprising providing content information regarding the broadcast image according to a default setting when the user is not the pre-registered user, wherein content information that the user has set as locked or in a locked status and content information that the user has not requested are not provided.

3. The method according to claim 1, wherein when different content information regarding the broadcast image is stored for another user and a locking function is set, the different content information is not provided to the user.

4. The method according to claim 1, wherein displaying the content guide image includes displaying a channel list image, wherein the channel list image includes the plurality of channel items, and the current channel item corresponding to the broadcast image displayed in the image display apparatus is highlighted.

5. The method according to claim 4, wherein the list of channels includes a list of preferred channels registered by the user.

6. The method according to claim 1, wherein displaying the content guide image includes displaying an electronic program guide (EPG) image, wherein the EPG image includes program guide information including the plurality of channel items, and the current channel item corresponding to the broadcast image displayed in the image display apparatus is highlighted.

7. The method according to claim 6, further comprising registering a time zone or a preferred channel whose information is to be included in an EPG image, wherein content information based on the registered time zone or the preferred channel is searched for and collected, and the EPG image is generated using the collected content information.

8. The method according to claim 1, wherein displaying the content guide image includes displaying a user interface image to allow a user to select information.

9. The method according to claim 1, further comprising:
determining whether the image display apparatus is powered-on or powered-off; and accessing a server of the network when the image display apparatus is determined to be powered-off, wherein searching the content information includes searching for the content information in the home server.

10. The method according to claim 1, wherein the content guide image includes additional information.

11. The method according to claim 10, wherein the additional information includes one of a sound attribute, an aspect ratio, an image quality, a genre, a title, a synopsis, a cast, or a play time of content.

12. The method according to claim 10, wherein the additional information includes at least one of information regarding a channel pre-registered by a user of the image display apparatus, information regarding a channel category preset by the user, or information regarding channels previous and next to a channel on which the main image is received.

13. The method according to claim 1, further comprising:
receiving a user signal through the content guide image; and transmitting a remote control signal to the image display apparatus, for controlling an operation of the image display apparatus based on the user signal.

14. The method according to claim 1, further comprising:
providing a channel selection signal to select a channel; and displaying a thumbnail image of a content corresponding to the channel selection signal, wherein the thumbnail image is a still image or a moving picture.

15. A remote controller comprising:
a camera to capture an image of a real environment around the remote controller, the captured image of the real environment including an image display apparatus displaying a broadcast image of a channel;

a wireless communication unit to wirelessly communicate with other electronic devices;

an identification unit to identify the image display apparatus about the remote controller based on the captured image;

a display including a touch screen and to provide an image display on the touch screen based on augmented reality; and a controller to perform a user authentication by determining whether a user to use the image display apparatus is a pre-registered user, to search, in the identified image display apparatus, for content information regarding the broadcast image and for content information that is personalized based on the user when the user is determined to be the pre-registered user and authenticated, to receive the content information based on the searched content information, and the controller to control the display to display, on the touch screen, a content guide image based on the received content information while simultaneously displaying a real image, captured by the camera, of the image display apparatus, wherein the content information includes a plurality of channel items, and a current channel item corresponding to the broadcast image displayed in the image display apparatus is highlighted in the content guide image.

16. The remote controller according to claim 15, wherein the controller provides content information regarding the broadcast image according to a default setting when the user is not the pre-registered user, and wherein content information that the user has set as locked or in a locked status and content information that the user has not requested are not provided.

17. The remote controller according to claim 16, wherein, when different content information regarding the broadcast image is stored for another user and a locking function is set, the controller does not provide the different content information.

18. The remote controller according to claim 15, wherein the display displays a channel list image as the content guide image, wherein the channel list image includes the plurality of channel items, and the current channel item corresponding to the broadcast image displayed in the image display apparatus is highlighted.

19. The remote controller according to claim 18, wherein the list of channels includes a list of preferred channels registered by the user.

20. The remote controller according to claim 15, wherein the display displays an electronic program guide (EPG) image as the content guide image, wherein the EPG image includes program guide information including the plurality of channel items, and the current channel item corresponding to the broadcast image displayed in the image display apparatus is highlighted.

21. The remote controller according to claim 20, wherein the controller registers a time zone or a preferred channel whose information is to be included in an EPG image, wherein content information based on the registered time zone or preferred channel is searched for and collected, and the EPG image is generated using the collected content information.

22. The remote controller according to claim 15, wherein the display displays a user interface image to allow a user to select information.

23. The remote controller according to claim 15, wherein the controller determines whether the image display apparatus is powered-on or powered-off, and accesses a server of a network when the identified image display apparatus is powered-off, and wherein the controller searches for the content information in the server.

24. The remote controller according to claim 15, wherein the remote controller receives a user signal based on the content guide image, and transmits a remote control signal to the identified image display apparatus, for controlling an operation of the image display apparatus based on the user signal.

25. The remote controller according to claim 15, wherein the remote controller receives a channel selection signal to select a channel, and the display displays a thumbnail image of content received on the channel corresponding to the channel selection signal, wherein the thumbnail image is a still image or a moving picture.

* * * * *